(12) United States Patent
Minaki et al.

(10) Patent No.: US 10,279,837 B2
(45) Date of Patent: May 7, 2019

(54) VEHICLE STEERING ANGLE DETECTING APPARATUS AND ELECTRIC POWER STEERING APPARATUS EQUIPPED WITH THE SAME

(71) Applicant: NSK LTD., Tokyo (JP)

(72) Inventors: Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/760,745

(22) PCT Filed: Sep. 16, 2016

(86) PCT No.: PCT/JP2016/077454
§ 371 (c)(1),
(2) Date: Mar. 16, 2018

(87) PCT Pub. No.: WO2017/061257
PCT Pub. Date: Apr. 13, 2017

(65) Prior Publication Data
US 2018/0257704 A1 Sep. 13, 2018

(30) Foreign Application Priority Data

Oct. 8, 2015 (JP) .................................. 2015-200388
Jan. 14, 2016 (JP) .................................. 2016-005221

(51) Int. Cl.
*A01B 69/00* (2006.01)
*B62D 6/00* (2006.01)
(Continued)

(52) U.S. Cl.
CPC ............... *B62D 6/10* (2013.01); *B62D 5/049* (2013.01); *B62D 5/0463* (2013.01);
(Continued)

(58) Field of Classification Search
CPC ........ B62D 6/10; B62D 5/049; B62D 5/0463; B62D 6/008; B62D 5/0472
(Continued)

(56) References Cited

U.S. PATENT DOCUMENTS

2012/0150389 A1* 6/2012 Oblizajek ............ B62D 5/0472
701/42
2014/0277944 A1* 9/2014 Bean ...................... B62D 6/008
701/41

FOREIGN PATENT DOCUMENTS

JP 2005-274484 A 10/2005
JP 2007-008299 A 1/2007
(Continued)

OTHER PUBLICATIONS

International Search Report for PCT/JP2016/077454 dated Oct. 11, 2016 [PCT/ISA/210].
(Continued)

*Primary Examiner* — Mahmoud S Ismail
(74) *Attorney, Agent, or Firm* — Sughrue Mion, PLLC

(57) ABSTRACT

A vehicle steering angle detecting apparatus and an electric power steering apparatus equipped therewith. The apparatus connects a motor, which assist-controls a steering system of a vehicle, to the steering shaft via a reduction mechanism, and includes a first angle sensor which detects the steering shaft angle of the steering shaft and the second angle sensor which detects the motor shaft angle of the motor, including: a function that updates a static characteristic map and a dynamic characteristic map by iteratively learning a static characteristic and a dynamic characteristic of the nonlinear elements including the reduction mechanism, and mutually estimates the steering shaft angle and the motor shaft angle by using the static characteristic map and the dynamic characteristic map.

19 Claims, 21 Drawing Sheets

(51) Int. Cl.
  *B62D 11/00* (2006.01)
  *B62D 12/00* (2006.01)
  *B63G 8/20* (2006.01)
  *B63H 25/04* (2006.01)
  *G05D 1/00* (2006.01)
  *G06F 7/00* (2006.01)
  *G06F 17/00* (2006.01)
  *G06F 19/00* (2018.01)
  *B62D 6/10* (2006.01)
  *B62D 5/04* (2006.01)
  *B62D 15/02* (2006.01)
  *G01B 21/22* (2006.01)
  *G06N 99/00* (2019.01)

(52) U.S. Cl.
  CPC ....... *B62D 5/0484* (2013.01); *B62D 15/0215* (2013.01); *B62D 15/0235* (2013.01); *G01B 21/22* (2013.01); *G06N 99/005* (2013.01); *B62D 5/0409* (2013.01)

(58) Field of Classification Search
  USPC .............................................. 701/41, 42, 43
  See application file for complete search history.

(56) References Cited

FOREIGN PATENT DOCUMENTS

| | | |
|---|---|---|
| JP | 2010-179848 A | 8/2010 |
| JP | 2012-158321 A | 8/2012 |
| WO | 2004/022414 A1 | 3/2004 |

OTHER PUBLICATIONS

Written Opinion for PCT/JP2016/077454 dated Oct. 11, 2016 [PCT/ISA/237].

\* cited by examiner

PRIOR ART

VEHICLE STEERING ANGLE DETECTING APPARATUS AND ELECTRIC POWER STEERING APPARATUS EQUIPPED WITH THE SAME

CROSS REFERENCE TO RELATED APPLICATIONS

This application is a National Stage of International Application No. PCT/JP2016/077454 filed Sep. 16, 2016, claiming priority based on Japanese Patent Application Nos. 2015-200388 filed Oct. 8, 2015 and 2016-005221 filed Jan. 14, 2016.

TECHNICAL FIELD

The present invention relates to an electric power steering apparatus that driving-controls a motor by means of a current command value (a steering assist command value) and assist-controls a steering system of a vehicle by driving-controlling the motor and a vehicle steering angle detecting apparatus provided in the electric power steering apparatus, and in particular to the vehicle steering angle detecting apparatus and the electric power steering apparatus equipped therewith that comprise an dual-system angle sensor disposed at a steering shaft (a pinion side) and an dual-system angle sensor disposed at a motor shaft, estimate a motor shaft angle and a steering shaft angle with a high accuracy by learning nonlinear elements of a mechanism system including a reduction mechanism, and the steering system as needed, judge an abnormality (including a failure) in comparison with an actual measuring value and an estimating value, and in a case that one angle sensor becomes abnormal, are possible to back up one angle sensor by utilizing a detection angle of the other angle sensor.

Further, the present invention relates to the vehicle steering angle detecting apparatus and the electric power steering apparatus equipped therewith that divide the nonlinear elements into a static characteristic (an angle error), a dynamic characteristic (an angle error) and a delay (a phase error), learn a combination thereof appropriately, can judge the abnormality of the nonlinear elements or the abnormality of the sensor system based on a result of the learning, and can deal with wide events in a range of a steering holding of a handle or a low speed steering to a high speed steering.

BACKGROUND ART

An electric power steering apparatus which provides a steering mechanism of a vehicle with a steering assist torque (an assist torque) by means of a rotational torque of a motor, applies a driving force of the motor as a steering assist torque to a steering shaft or a rack shaft by means of a transmission mechanism such as gears or a belt through a reduction mechanism, and assist-controls the steering mechanism of the vehicle. In order to accurately generate the assist torque, such a conventional electric power steering apparatus (EPS) performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a steering shaft (a column shaft or a handle shaft) 2 connected to a handle (a steering wheel) 1 is connected to steered wheels 8L and 8R through reduction gears (a worm gear and a worm) 3, universal joints 4a and 4b, a rack-and-pinion mechanism 5, and tie rods 6a and 6b, further via hub units 7a and 7b. In addition, the torsion bar is interposed within the steering shaft 2, the steering shaft 2 is provided with a steering angle sensor 14 as the vehicle steering angle detecting apparatus for detecting a steering angle θ of the handle 1 by means of a torsional angle of the torsion bar and a torque sensor 10 for detecting a steering torque Th, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command on the basis of the steering torque Th detected by the torque sensor 10 and a vehicle speed Vel detected by a vehicle speed sensor 12, and controls a current supplied to the motor 20 by means of a voltage control command value Vref obtained by performing compensation or the like to the current command value. It is possible to receive the vehicle speed Vel from a controller area network (CAN) or the like.

A controller area network (CAN) 40 to send/receive various information and signals on the vehicle is connected to the control unit 30, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. As shown in FIG. 2, the steering torque Th detected by the torque sensor 10 and the vehicle speed Vel detected by the vehicle speed sensor 12 (or from the CAN 40) are inputted into a current command value calculating section 31 which calculates the current command value Iref1. The current command value calculating section 31 calculates the current command value Iref1, based on the steering torque Th and the vehicle speed Vel with reference to an assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A deviation I (=Irefm−Im) between the current command value Irefm and a motor current value Im which is fed-back is calculated at the subtracting section 32B, and the deviation I is inputted into a current control section 35 which performs a proportional-integral-control (PI-control) and the like for improving a current characteristic of the steering operation. The voltage control command value Vref that the characteristic is improved at the current control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. The inverter 37 is constituted by a bridge circuit of field-effect transistors (FETs) as a semiconductor switching device.

A rotational sensor 21 such as a resolver, as the vehicle steering angle detecting apparatus, is connected to the motor 20 and a motor rotational angle θ is outputted.

A compensation signal CM from a compensation signal generating section 34 is added at the adding section 32A. A characteristic compensation of the steering system is performed by adding the compensation signal CM, and a convergence, an inertia characteristic and the like are improved. The compensation signal generating section 34 adds a self-aligning torque (SAT) 343 to an inertia 342 at an adding section 344. The adding result is further added with a convergence 341 at an adding section 345. The adding result at the adding section 345 is treated as the compensation signal CM.

In the electric power steering apparatus as described above, recently, the torque sensors and the angle sensors can be equipped with multiplexing due to requirements of a reliability improvement, a functional redundancy and the like. However, since the requirement of a cost reduction is also existed, it is not easy to simply multiplex the sensors. Therefore, by utilizing the currently mounted sensors at the maximum, a method that the sensors monitor and diagnose each other is preferred. Furthermore, the steering shaft of the electric power steering apparatus is connected to the motor shaft via the reduction mechanism such as the worm gear and the worm.

In a case of multiplexing the angle sensors, in other words, in a case that the dual-system angle sensors are equipped with the steering shaft and the motor shaft, when one system is failed, it is considered that the other system backs up the failed system. However, in general, since the mechanism system including the reduction mechanism and the steering system have the nonlinear elements such as friction, backlash, an elastic coupling of the motor output shaft, preload to a gear surface by means of a worm wheel and the worm, and lubricating grease of the reduction mechanism section, an angle of the steering shaft is different from that of the motor shaft and therefore an angle error occurs. In this connection, when one of the angle sensors is failed, the other of the angle sensors cannot immediately back up (substitution in the abnormality) the failed angle sensors.

As a prior art, WO 04/022414 (Patent Document 1) discloses a method for measuring a torque for a vehicle having an electromechanical steering system, and the disclosed method is considered as a torque sensor for backup. An overall configuration is an electromechanical steering system comprising an input shaft section and an output shaft section being connected to a driving steering mechanism, and a steering means having a servo motor being connected via a torsion bar. Although the configuration is the electromechanical steering apparatus (a digital circuit or an analog circuit) which performs torque detection due to a relative rotational displacement between the input shaft section and the output shaft section of the driving steering mechanism, the above apparatus forms a sensor for detecting a virtual torque by two inputs being an output of a steering angle (δ) sensor and a rotational angle of the servo motor, and the steering torque is determined from the virtual torque.

Further, in Japanese Unexamined Patent Publication No. 2005-274484 A (Patent Document 2), the apparatus is equipped with the plural steering angle sensors (three sensors) which constitute a redundant system.

THE LIST OF PRIOR ART DOCUMENTS

Patent Documents

Patent Document 1: WO 04/022414
Patent Document 2: Japanese Unexamined Patent Publication No. 2005-274484 A

SUMMARY OF THE INVENTION

Problems to be Solved by the Invention

However, in the apparatus of Patent Document 1, although, the rotor rotational information of the servo motor can back up the failure of the steering angle sensor as the system of the backup, it is impossible to diagnose and back up the both sensors each other. Further, in the example of the Patent Document 2, since the component around the steering system is enlarged, the apparatus is badly affected in assembling the vehicle, and generally there is a problem of the cost increasing.

The present invention has been developed in view of the above-described circumstances, and an object of the present invention is to provide the vehicle steering angle detecting apparatus and the electric power steering apparatus equipped therewith having a high quality and a reasonable price that enhance a reliability and a redundancy of the angle detecting by using duplex angle sensors at the motor side and the pinion side, estimate the motor shaft angle and the steering shaft angle with a high accuracy by learning the nonlinear elements of the mechanism system including a reduction mechanism and the steering system, and can back up the both angle sensors by utilizing the estimating angles of the both angle sensors.

Further, in the learning of the nonlinear elements in the mechanism system and the steering system, factors are divided into the static characteristic, the dynamic characteristic and the delay characteristic, and the present invention provides learning styles in considering the above divided characteristics. Furthermore, the present invention is to provide the vehicle steering angle detecting apparatus and the electric power steering apparatus equipped therewith that judge the case of completing the learning or the case of not completing the learning unfavorably based on a range of tolerance error, judge the abnormality including the failure (the nonlinear elements or the sensor system) in a case of not completing the learning even when the learning is performed for a predetermined times, can deal with the wide events in a range of the steering holding of the handle or from the low speed steering to the high speed steering, and further consider environment variation such as a temperature.

Means for Solving the Problems

The present invention relates to a vehicle steering angle detecting apparatus that connects a motor, which assist-controls a steering system of a vehicle, to a steering shaft via a reduction mechanism, and comprises a first angle sensor to detect a steering shaft angle of the steering shaft and a second angle sensor to detect a motor shaft angle of the motor, the above-described object of the present invention is achieved by that: comprising a function that updates a static characteristic map and a dynamic characteristic map by iteratively learning a static characteristic and a dynamic characteristic of nonlinear elements which include the reduction mechanism, and mutually estimates the steering shaft angle and the motor shaft angle by using the static characteristic map and the dynamic characteristic map.

The above-described object of the present invention is efficiently achieved by that: wherein a learning of the static characteristic and a learning of the dynamic characteristic are performed when initial values based on an actual measuring angle of the first angle sensor, an actual measuring angle of the second angle sensor, a motor torque of the motor and a motor angle velocity are out of approximate value ranges of respective characteristic nominal values which are in advance stored; or wherein a delay characteristic map is further interposed in a subsequent stage of the dynamic characteristic map; or wherein a learning of a delay characteristic is performed when initial values based on an actual measuring angle of the first angle sensor, an actual measuring angle of the second angle sensor, and the motor torque are out of approximate value ranges of delay characteristic nominal values which are in advance stored; or wherein a deviation between an estimating value of the steering shaft angle and an actual measuring value of the first angle sensor and a deviation between an estimating value of the motor shaft angle and an actual measuring value of the second angle sensor are respectively calculated, and the updating is performed in a case that the respective deviations are within respective tolerance ranges of the static characteristic map and the dynamic characteristic map; or wherein the respective tolerance ranges have different specifications depending on a destination, and respective initial values are set depending on the destination; or wherein the first angle sensor and the second angle sensor are a dual system, respectively; or wherein in a case that the deviations are out of the respective tolerance ranges, the learnings of the static characteristic and the dynamic characteristic are iterated until predetermined times; or wherein in a case that a number, which the deviations are out of the respective tolerance ranges, is larger than the predetermined times, judging of detection values in respective dual systems of the first angle sensor and the second angle sensor is performed; or wherein in the judging, in a case that detection values in respective dual systems of the first angle sensor and the second angle sensor are a same value, an abnormality of the nonlinear elements is judged, and in a case that detection values in respective dual systems of the first angle sensor and the second angle sensor are not a same value, an abnormality of the sensor system is judged.

Further, the present invention relates to an electric power steering apparatus, the above-described object of the present invention is achieved by that: having the vehicle steering angle detecting apparatus or having the vehicle steering angle detecting apparatus, wherein, when an abnormality of an estimating angle in one sensor system is judged, the assist-control is continued by using an estimating angle in the other sensor system.

Effects of the Invention

In the vehicle steering angle detecting apparatus and the electric power steering apparatus equipped therewith according to the present invention, in a case that one of the angle sensors is abnormal (including the failure), the other of the angle sensors can mutually back up the abnormal angle sensor by using the duplex angle sensors, obtaining the compensation value maps by means of learning the nonlinear elements of the mechanism system including the reduction mechanism, and the steering system as needed, estimating the motor shaft angle and the steering shaft angle (the pinion side) with a high accuracy based on the compensation value maps, and utilizing the estimating angles of the both angle sensors.

By performing the abnormality diagnosis and the function continuation by means of using the estimating angle of the steering shaft angle and the estimating angle of the motor shaft, it is possible to eliminate one sensor. For example, as disclosed in Patent Document 2, it is necessary that the angle sensors are a triple system to perform the abnormality diagnosis and the assist-control continuation. By using the estimating angles, the angle sensors can be a dual system.

MODE FOR CARRYING OUT THE INVENTION

Figure 1:
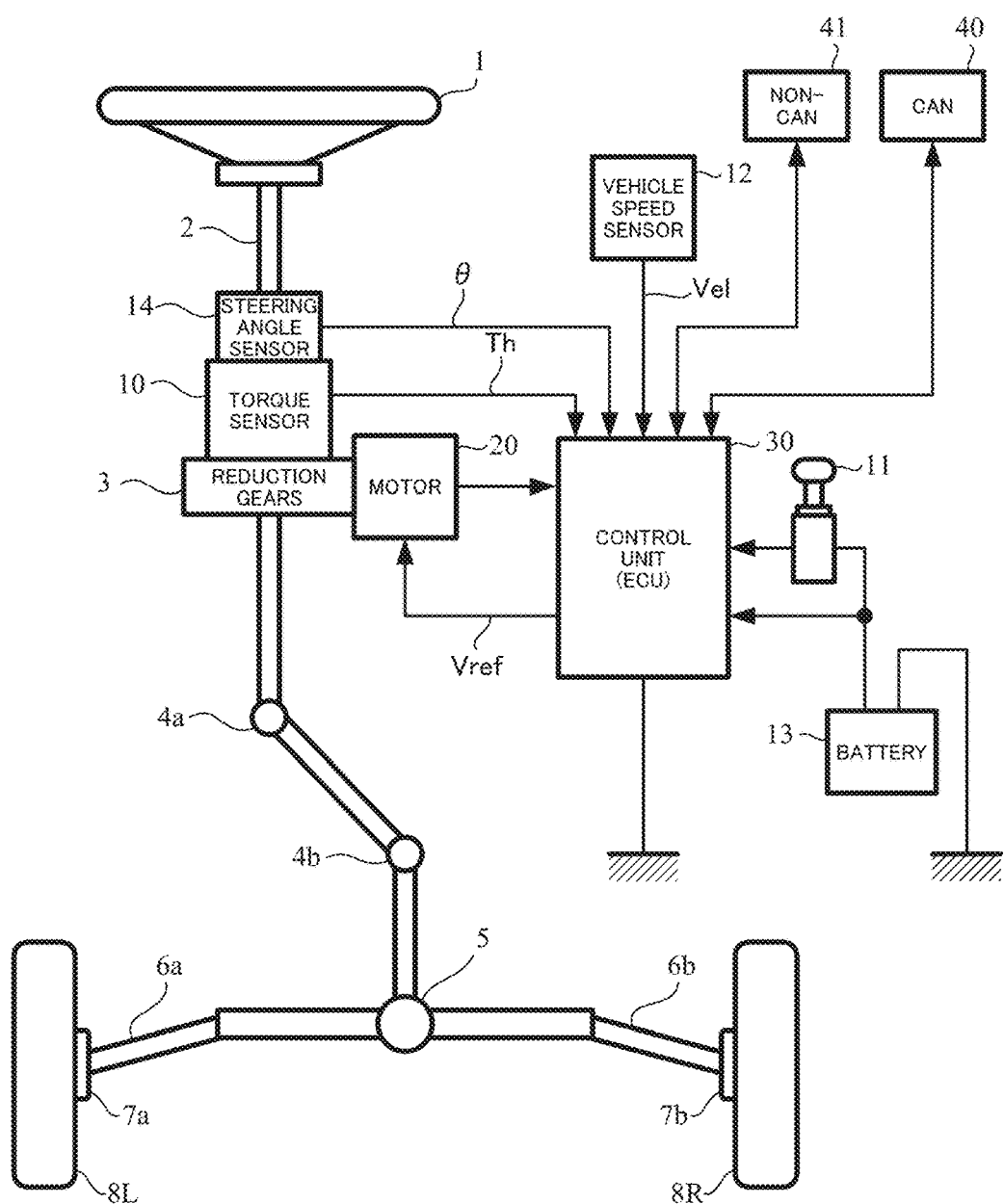
FIG. 1 is a configuration diagram showing a general outline of the electric power steering apparatus.
Figure 2:
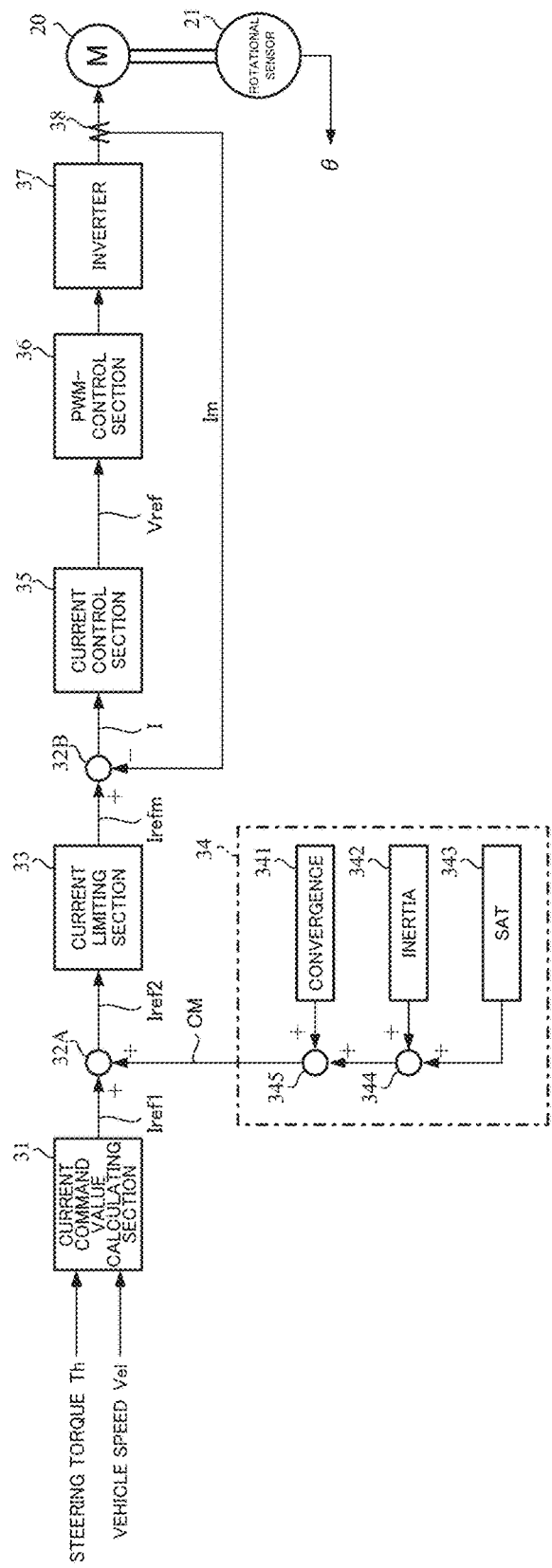
FIG. 2 is a block diagram showing a configuration example of a control system of the electric power steering apparatus.

The present invention estimates a motor shaft angle and a steering shaft angle (a pinion side) with a dual system and a high accuracy by learning nonlinear elements such as friction, backlash, an elastic coupling of a motor output shaft, preload to a gear surface by means of a worm wheel and a worm, lubricating grease of a gear section and an abutting state (deflection) of the gear surface in a mechanism system including a reduction mechanism, and a steering system as needed. In a case that one angle sensor is abnormal (including a failure), the other angle sensor backs up the one angle sensor, and the feature of the present invention resides in that an assist-control is continued by utilizing the estimating angles of the both angle sensors. A backup logic of the both angle sensors is common, and it is possible to immediately back up the angle sensors after restarting an engine by storing compensation value maps of nonlinear compensation identified by learning in a nonvolatile memory such as an electrically erasable programmable read-only memory (EEPROM).

In product shipment, nominal values based on experience and the like are stored as initial values in the nonvolatile memory such as the EEPROM. In a case that actual compensation values when an ignition key is turning-ON, are out of approximate value ranges of the nominal values (in a case that the learning is needed), a static characteristic learning, a dynamic characteristic learning and a delay characteristic learning are performed. Antecedently, tuned data which are suitable for environments (mainly, a temperature and humidity data depending on climate of a destination) of a destination of the vehicle (destination countries for export, destination regions for export and the like), are inputted as the nominal values.

Further, in the present invention, after performing the learning for plural times, in a case that an error between an estimating value and an actual measuring value is not converged within a predetermined tolerance range, an abnormality of the angle sensor or an abnormality of the nonlinear elements (for example, a reduction mechanism) is judged depending on being information of the dual-system sensors with the same value or not. Alternatively, by applying a time stamp to each of receiving detection signals from the respective sensors, an accurate synchronization may be performed, an angle error may be suppressed and a steering velocity which the steering angle detection is enabled may be higher (for example, Japanese Unexamined Patent Publication No. 2014-210471 A). In a case that a detection period of the angle sensor disposed on the steering shaft (for example, 500 [μs]) is different from the detection period of a resolver, a magneto resistive sensor (an MR sensor) or the like which is disposed on the motor shaft (for example, 250 [μs]), the time stamp is especially effective for improving the detection accuracy by synchronizing the both angle sensors.

Embodiments according to the present invention will be described with reference to the drawings.

Figure 3:
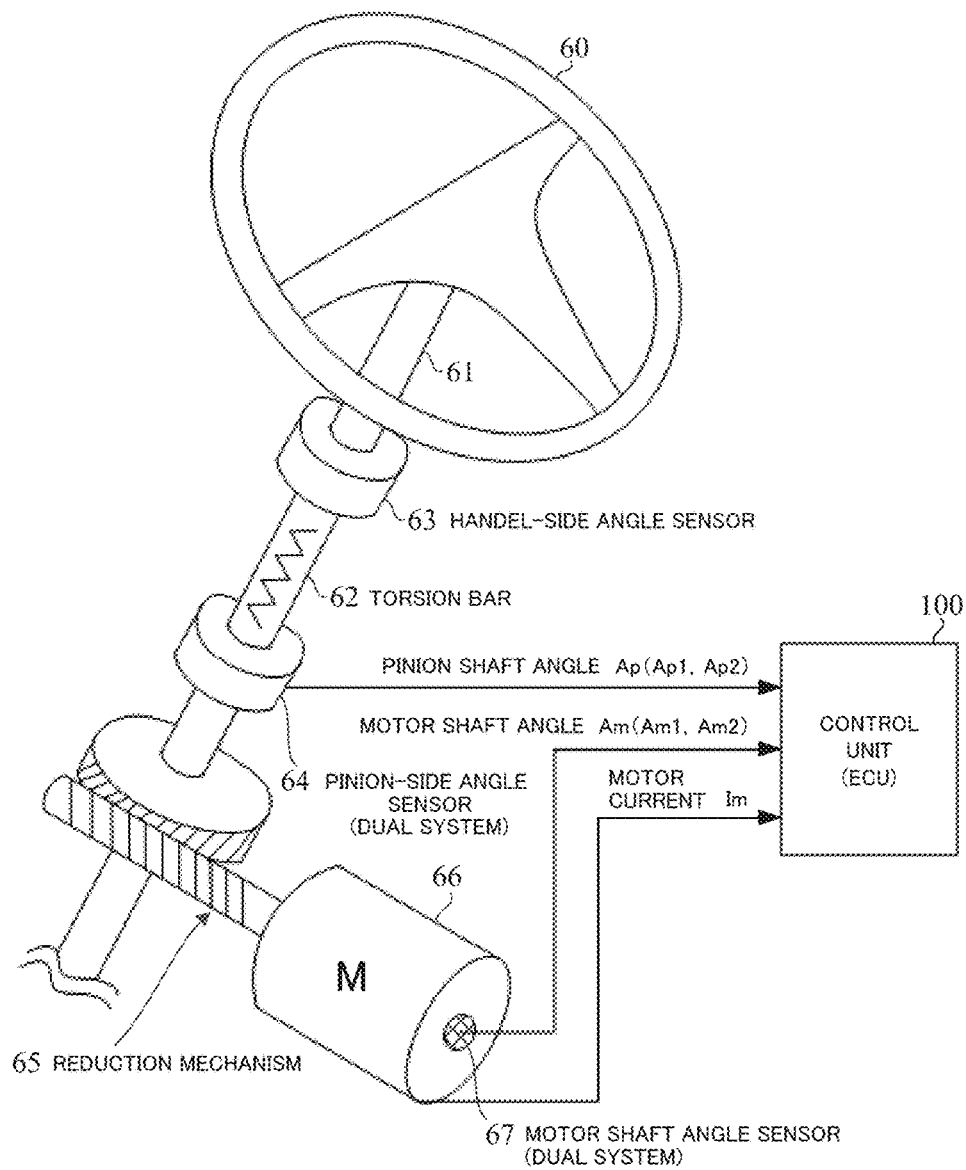
FIG. 3 is a block diagram showing an arrangement example of angle sensors of the present invention.

As shown in FIG. 3, in the present invention, a dual-system handle-side angle sensor 63 to a handle side of the steering shaft 61, and a dual-system pinion-side angle sensor 64 to a pinion side of the steering shaft 61 are disposed to a torsion bar 62 of the steering shaft 61 which is steered by the handle (a steering wheel) 60. A pinion shaft angle (a steering shaft angle) Ap is outputted from the pinion-side angle sensor 64. The steering shaft 61 is connected to the motor 66 via the reduction mechanism 65 such as the worm gear. The dual-system motor shaft angle sensor 67 (for example, the resolver or the MR sensor) which detects a motor shaft angle Am, and a motor current detector (not shown) which detects a motor current Im are disposed on the motor 66. An elastic coupling (not shown) is disposed at a coupling section of the motor shaft and the reduction mechanism 65.

In the present invention, the steering shaft (the pinion side) 61 is equipped with the angle sensor 64 with a dual system, and the motor shaft is equipped with the angle sensor 67 with a dual system. In a case that one of the angle sensors is abnormal, it is considered that the other angle sensor backs up the one angle sensor by utilizing the detection angle of the other angle sensor, and an assist-control is continued. The steering shaft angle Ap from the pinion-side angle sensor 64, the motor shaft angle Am from the motor shaft angle sensor 67 and the motor current Im from the motor current detector are inputted into a control unit (ECU) 100.

As well, although the detection angle is outputted from the handle-side angle sensor 63, this detection angle is not directly relevant to the present invention, and the explanation is omitted. It is described that the pinion-side angle sensor 64 is defined as the steering shaft angle sensor and the pinion shaft angle Ap is defined as the steering shaft angle in the following explanation.

Figure 4:
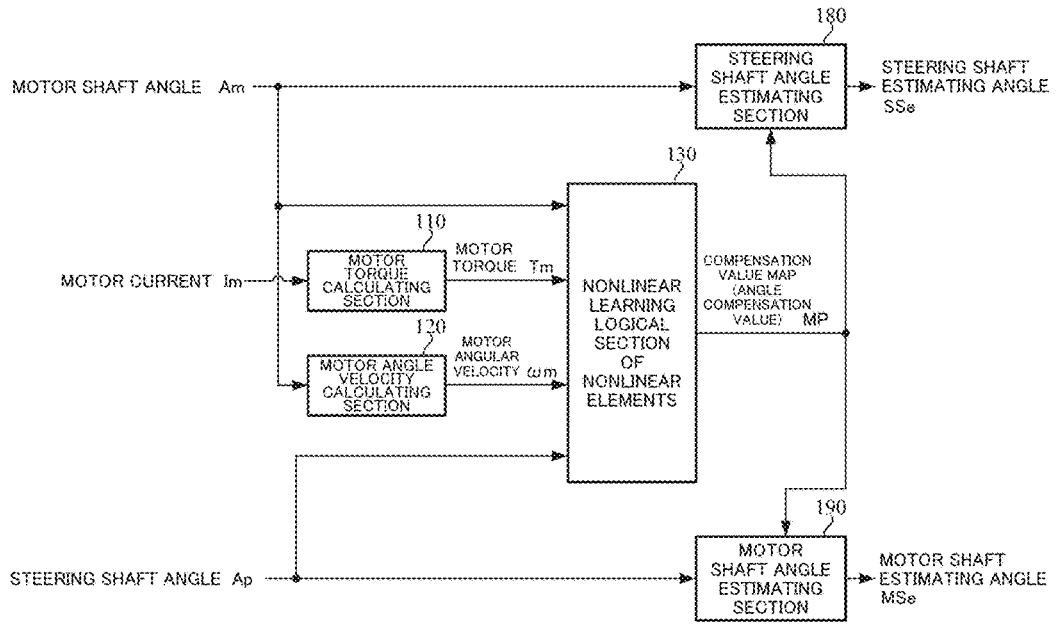
FIG. 4 is a block diagram showing a configuration example of a control unit (ECU) of the present invention.

Although the rotational shaft of the steering shaft 61 is connected to that of the motor 66 via the reduction mechanism 65 comprising the worm and the worm gear (the worm wheel), the mechanism system including the reduction mechanism 65 and the steering system include lots of nonlinear elements. That is, since the mechanism system and the steering system include the nonlinear elements such as friction, backlash, an elastic coupling of the motor output shaft, preload to the gear surface by means of the worm wheel and the worm, lubricating grease of the gear section and the abutting state (deflection), it is impossible to back up, in a case that one of the angle sensors is abnormal, by simply replacing the detection value of the one of the angle sensor with that of the other of the angle. Consequently, in the present invention, by iteratively learning the nonlinear elements of the mechanism system including the reduction mechanism 65 and the steering system, the one angle sensor estimates the output angle of the other angle sensor and vice versa. A configuration example of the control unit (ECU) 100 which performs such a function is shown in FIG. 4.

The motor current Im is inputted into a motor torque calculating section 110, the calculated motor torque Tm is inputted into a nonlinear learning logical section 130 of the nonlinear elements, the motor shaft angle Am is inputted into a motor angular velocity calculating section 120 and the calculated motor angular velocity ωm is inputted into the nonlinear learning logical section 130 of the nonlinear elements. An angle compensation value MP which is calculated in the nonlinear learning logical section 130 of the nonlinear elements is inputted into a steering shaft angle estimating section 180 and a motor shaft angle estimating section 190. A pinion-side steering shaft angle Ap is inputted into the nonlinear learning logical section 130 of the nonlinear elements and the motor shaft angle estimating section 190. The motor shaft angle Am is inputted into the motor angular velocity calculating section 120, the nonlinear learning logical section 130 of the nonlinear elements and the steering shaft angle estimating section 180. A steering shaft estimating angle SSe is outputted from the steering shaft angle estimating section 180, and a motor shaft estimating angle MSe is outputted from the motor shaft angle estimating section 190.

Next, a relationship between an abnormality diagnosis of the sensors (including a failure diagnosis) and a backup (the assist-control continuation) is individually described in the following cases.

(1) A Case of Performing the Abnormality Diagnosis and the Backup:

In this case, it is necessary to have a dual system of the angle sensors and the estimated estimating angle.

(1-1) A Case of the Steering Shaft Angle

The sensor configuration is the dual system of the angle sensors of the steering shaft (the pinion-side angle sensors 64-1 (the steering shaft angle Ap1) and 64-2 (the steering shaft angle Ap2)), and the steering shaft estimating angle SSe is used. The abnormality diagnosis is performed by decision of a majority among the steering shaft angles Ap1 and Ap2, and the steering shaft estimating angle SSe. For example, in a case that the pinion-side angle sensor 64-1 (the steering shaft angle Ap1) is abnormal, the steering shaft angle Ap2 of the pinion-side angle sensor 64-2 is used for the backup (the assist control continuation).

(1-2) A Case of the Motor Shaft Angle

The sensor configuration is the dual system of the angle sensors of the motor shaft (the motor shaft angle sensors 67-1 (the motor shaft angle Am1) and 67-2 (the motor shaft angle Am2)), and the motor shaft estimating angle MSe is used. The abnormality diagnosis is performed by decision of a majority among the motor shaft angles Am1 and Am2, and the motor shaft estimating angle MSe. For example, in a case that the motor shaft angle sensor 67-1 (the motor shaft angle Am1) is abnormal, the motor shaft angle Am2 of the motor shaft angle sensor 67-2 is used for the backup (the assist control continuation).

(2) A Case of Only the Abnormality Diagnosis

In this case, the backup is not performed, and it is necessary to have one angle sensor and the estimated estimating angle.

(2-1) A Case of the Steering Shaft Angle

The sensor configuration is the steering shaft angle sensor 64 of the steering shaft (the steering shaft angle Ap) and the steering shaft estimating angle SSe. The abnormality diagnosis is performed by comparing the steering shaft angle Ap with the steering shaft estimating angle SSe. In a case that the steering shaft angle sensor 64 is abnormal, the assist-control is stopped.

(2-2) A Case of the Motor Shaft Angle

The sensor configuration is the motor shaft angle sensor 67 of the motor shaft (the motor shaft angle Am) and the motor shaft estimating angle MSe. The abnormality diagnosis is performed by comparing the motor shaft angle Am with the motor shaft estimating angle MSe. In a case that the motor shaft angle sensor 67 is abnormal, the assist-control is stopped.

Figure 5:
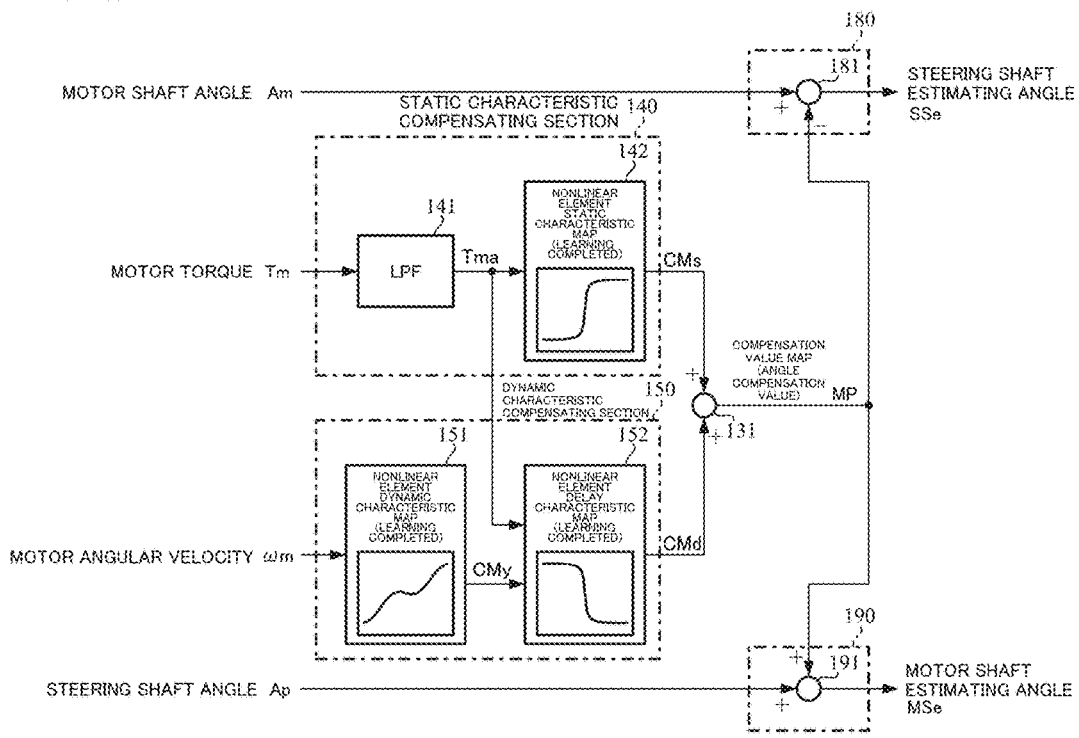
FIG. 5 is a block diagram showing a configuration example (the first embodiment) of a nonlinear learning logical section of nonlinear elements, a steering shaft angle estimating section and a motor shaft angle estimating section according to the present invention.

FIG. 5 shows a detail configuration example of the nonlinear learning logical section 130 of the nonlinear elements, the steering shaft angle estimating section 180 and the motor shaft angle estimating section 190, and the nonlinear learning logical section 130 of the nonlinear elements comprises a static characteristic compensating section 140 to calculate the compensation value CMs, a dynamic characteristic compensating section 150 to calculate the compensation value CMd and an adding section 131 to add the compensation value CMd to the compensation value CMs, and outputs an angle compensation value MP. As shown in FIG. 5, the angle estimating can largely be divided into a static characteristic compensation and a dynamic characteristic compensation. The static characteristic compensation is an angle compensation of a static characteristics when the handle is steering-holding, and an angle compensation of a dynamic characteristics in a slow steering which the handle is steered with 5 [deg/s] or less when a driver drives the vehicle, stops at an intersection, and slowly turns right or left in confirming safety. The static characteristic compensation calculates a static characteristic compensation value CMs by a static characteristic map whose input is a motor torque Tm (or a noise-removed motor torque Tma which is passed through a low pass filter (LPF)). The dynamic characteristic compensation is an angle compensation when the handle is steered with some speeds (50 [deg/s]) or more, in a case that the driver operates abrupt steering in suddenly appearing a human, and calculates an overall dynamic characteristic compensation value CMd which is considered a delay time depending on the motor torque Tm (the noise-removed motor torque Tma) to a dynamic characteristic compensation value CMy by a dynamic characteristic map whose input is a motor angular velocity ωm.

The static characteristic compensating section 140 comprises a low pass filter (LPF) 141 which inputs the motor torque Tm, and a nonlinear element static characteristic map (learning completed) 142 which inputs the noise-removed motor torque Tma removed from high frequency noises at the LPF 141, and outputs the compensation value CMs. The LPF 141 is required for preventing from an erroneous learning. The motor torque Tm is a current which is passed through the motor. Since the motor current includes a ripple current component, a white noise, higher harmonics and the like, portions of large noises (peaks) are sampled (for example, every 250 [μs]), and the static characteristic map 142 can be deformed when the LPF process is not performed. Then, the LPF whose cutoff frequencies are in a range of 20 [Hz] to 30 [Hz] is adopted.

Furthermore, the dynamic characteristic compensating section 150 comprises a nonlinear element dynamic characteristic map 151 which inputs the motor angular velocity ωm and outputs the compensation value CMy, and a nonlinear element delay characteristic map (learning completed) 152 which inputs the compensation value CMy outputted from the nonlinear element dynamic characteristic map 151 and the noise-removed motor torque Tma from the LPF 141, and outputs the compensation value CMd. The compensation value CMd is added to the compensation value CMs at the adding section 131, and the added value is outputted as a final angle compensation value MP (the compensation value map in the learning).

The angle compensation value MP is subtracting-inputted into a subtracting section 181 in the steering shaft angle estimating section 180, and is adding-inputted into an adding section 191 in the motor shaft angle estimating section 190. The subtracting section 181 subtracts the angle compensation value MP from the motor shaft angle Am, and outputs the steering shaft estimating angle SSe. The adding section 191 adds the angle compensation value MP to the steering shaft angle Ap, and outputs the motor shaft estimating angle MSe. Since the angle compensation value MP is an angle difference between the static characteristic compensating section 140 and the dynamic characteristic compensating section 150, and the motor torque Tm and the motor angular velocity ωm, which are a motor reference, are inputted into the static characteristic compensating section 140 and the dynamic characteristic compensating section 150, respectively, the angle compensation value MP is subtracting-inputted into the steering shaft angle estimating section 180 as a subtracting element and is inputted into the motor shaft angle estimating section 190 as an adding element.

Thereafter, it is performed the diagnoses whether errors (absolute values) between the steering shaft estimating angle SSe and the motor shaft estimating angle MSe and the respective actual measuring value are within a tolerance range ε or not, and the learning is repeated until the errors become within the tolerance range ε. The learning is completed at the time when the errors are within the tolerance range ε. That is, the diagnoses are performed in accordance with a following Equation 1. When the Equation 1 is satisfied, the learning is completed, and when the Equation 1 is not satisfied, the learning is repeated in the predetermined number (for example, twice). In the Equation 1, it is judged whether the absolute value of the difference between the steering shaft estimating angle SSe and the steering shaft angle Ap is within a tolerance range ε1 or not, and whether the absolute value of the difference between the motor shaft estimating angle MSe and the motor shaft angle Am is within a tolerance range ε2 or not. By iterating the learning, the accuracy of the estimating angle can be higher, and it is possible to handle with surrounding environmental variations (the temperature and the humidity), the aging variations of the mechanism components and the like. The tolerance range ε1 may be equal to the tolerance range ε2 (ε1=ε2).

$$|SSe-AP| \leq \varepsilon 1$$

$$|MSe-Am| \leq \varepsilon 2 \quad \text{[Equation 1]}$$

As well, in a case that both or one of inequalities in the Equation 1 is not satisfied even when repeating the learning, it is judged that one of the nonlinear elements and the sensor system is abnormal (or failed).

Figure 6:
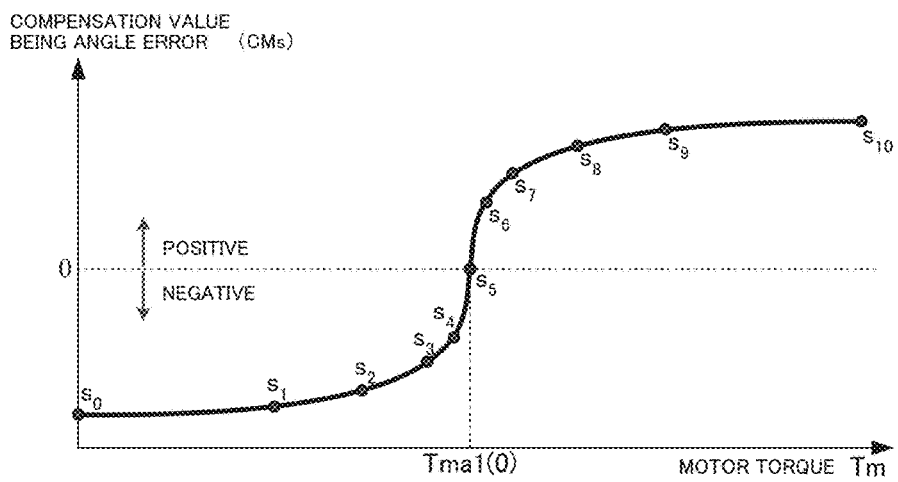
FIG. 6 is a graph showing a characteristic example of a static characteristic map (learning completed) of the nonlinear elements.
Figure 7:
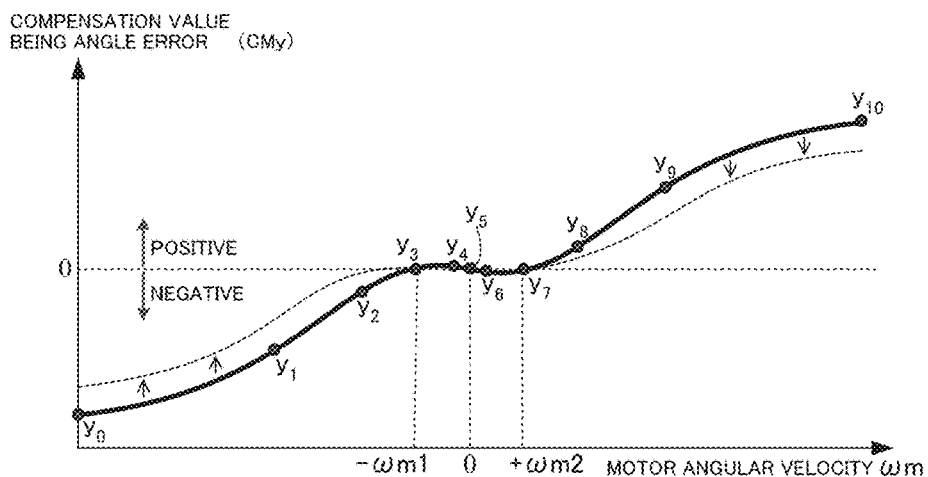
FIG. 7 is a graph showing a characteristic example of a dynamic characteristic map (learning completed) of the nonlinear elements.

As shown in FIG. 6, when the motor torque Tm is larger from Tm1 (=0) in a positive or negative direction, the nonlinear element static characteristic map 142 has a characteristic that the compensation value (CMs) being the angle error gradually and nonlinearly becomes larger. The compensation value (CMs) steeply increases or decreases near the motor torque Tm1 (=0). As shown in FIG. 7, when the motor angular velocity ωm is higher from zero in the positive or negative direction, the nonlinear element dynamic characteristic map 151 has a characteristic that the compensation value (CMy) being the angle error gradually and nonlinearly becomes larger. The compensation value (CMy) has a substantially flat characteristic when the motor angular velocity is in a range of −ωm1 to +ωm2 (for example, 50[deg/s]), which is near zero. The static characteristic can be covered at the flat portion. Since viscosity decreases when the temperature is high, the compensation value decreases overall.

Figure 8:
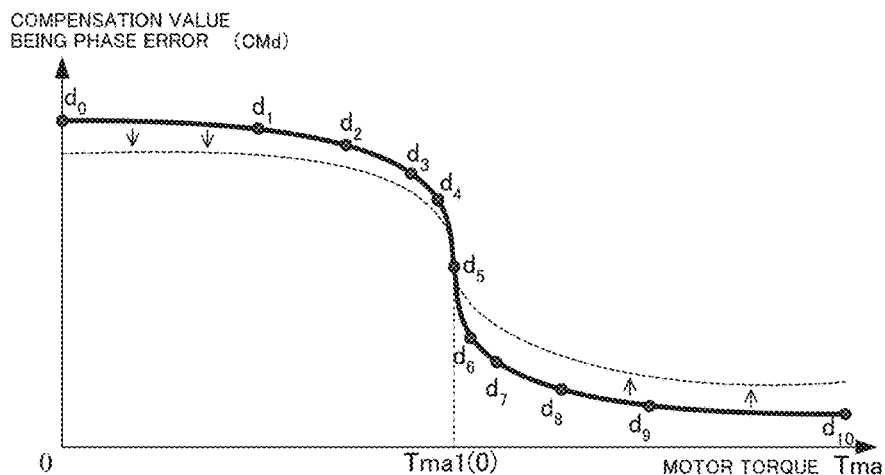
FIG. 8 is a graph showing a characteristic example of a delay characteristic map (learning completed) of the nonlinear elements.

Further, as shown in FIG. 8, when the motor torque Tma from the LPF 141 is larger, the nonlinear element delay characteristic map 152 has a characteristic that the compensation value (CMd) being a phase error gradually and nonlinearly becomes smaller. The compensation value (CMd) steeply decreases near the motor torque Tma1(0), and finally converges almost zero when the motor torque Tma is larger. In the temperature characteristic of the delay characteristic map 152, since the viscosity decreases when the temperature is high, the compensation value also decreases overall.

The learning of respective characteristic maps (142, 151 and 152) is corresponding to creating the maps. As the maps are learned in the wide range (for example, from one (a positive side) of the rack end neighborhood to the other (a negative side) of the rack end neighborhood) against horizontal axes (the motor torque Tm, the motor angle speed ωm and the motor torque Tma), the error becomes small. That is, it is meaningless that the learning is only a particular point (for example, in FIG. 6, near a point $s_5$ (Tm1=0, CMs=0)). Since the point numbers of the maps are depending on capacities of a random access memory (RAM) and a read-only memory (ROM) of a microcomputer, and an arithmetic speed of a CPU, it cannot be concluded against the point numbers of the maps. When the point numbers which are some extent range are covered against the horizontal axes, the apparatus judges that the learning is completed. In the examples of FIG. 6 to FIG. 8, each of the horizontal axes is divided into ten portions, and it is judged that the learning is completed when the learning is performed at eleven points.

As well, in a region which the characteristic variation is large, the learning is performed with an interval as narrowly as possible, and in a region which the characteristic variation is small, the learning is performed with a wide interval.

In angle estimating of respective components in the electric power steering apparatus, it is necessary to compensate the above all nonlinear elements such as the friction and the backlash in the mechanism system including the reduction mechanism 65 and the steering system. For performing the compensation, at least the static characteristic learning is requested, and the dynamic characteristic learning is preferably performed after the static characteristic learning. Further, the delay learning can be performed.

Figure 9:
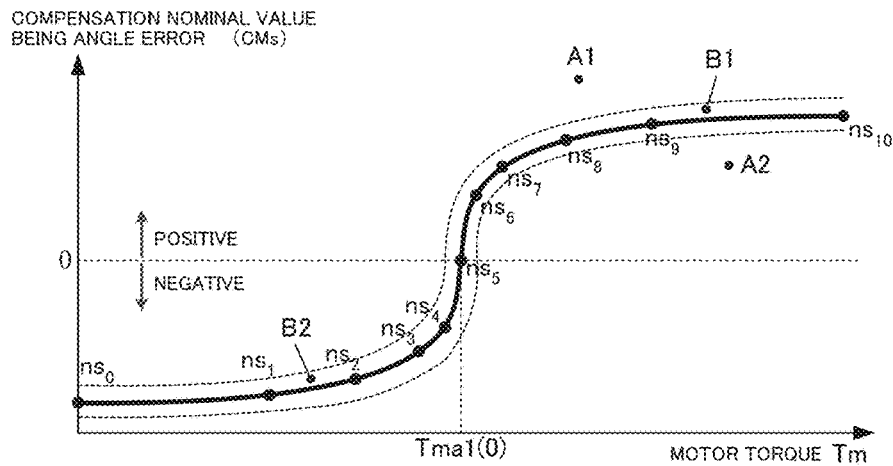
FIG. 9 is a graph showing a setting example of nominal values of the static characteristic map of the nonlinear elements.
Figure 10:
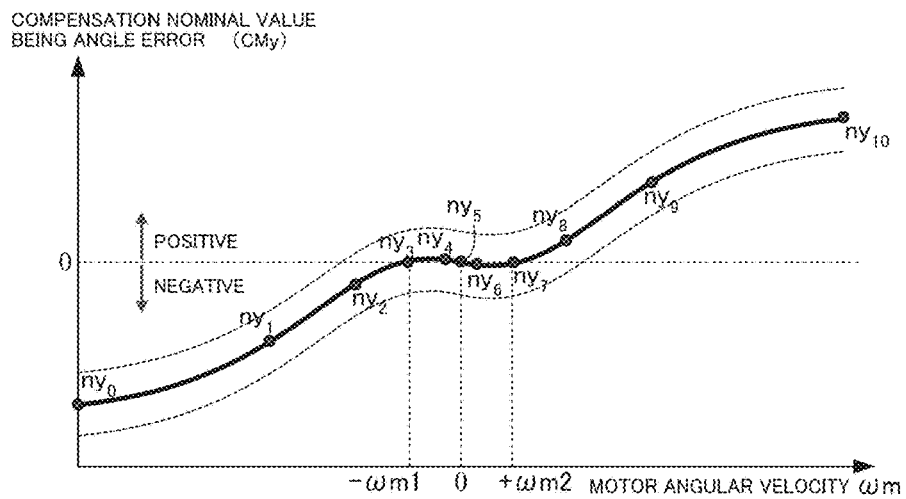
FIG. 10 is a graph showing a setting example of nominal values of the dynamic characteristic map of the nonlinear elements.
Figure 11:
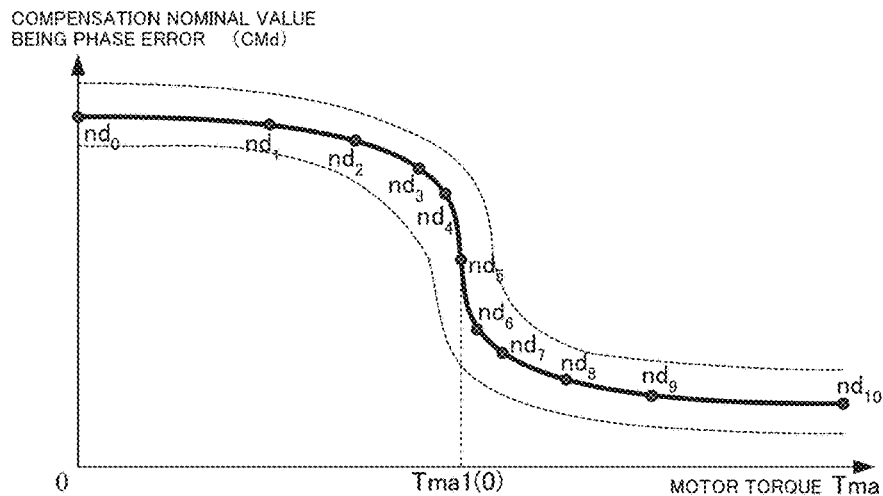
FIG. 11 is a graph showing a setting example of nominal values of the delay characteristic map of the nonlinear elements.

In the product shipment, since the learning data cannot be acquired, as shown in FIG. 9 to FIG. 11, nominal values of the respective characteristics based on the experience and the like are in advance stored in the nonvolatile memory such as the EEPROM. When the actual data are out of the approximate value ranges of the nominal values as shown in the dashed lines, the learning is performed. Antecedently, the tuned data being suitable for environments (mainly, the temperature and the humidity data depending on the climate of a destination) of a destination of the vehicle (the destination country for export, the destination region for export and the like), are adopted as the nominal data. FIG. 9 is a graph which shows a setting example of the nominal values ($ns_0$ to $ns_{10}$) of the nonlinear element static characteristic map, and the dashed lines represent the approximate range which judges whether the learning is needed or not. FIG. 10 is a graph which shows the setting example of the nominal values ($ny_0$ to $ny_{10}$) of the nonlinear element dynamic characteristic map, and the dashed lines represent the approximate range which judges whether the learning is needed or not. FIG. 11 is a graph which shows the setting example of the nominal values ($nd_0$ to $nd_{10}$) of the nonlinear element delay characteristic map, and the dashed lines represent the approximate range which judges whether the learning is needed or not.

Here, in the present embodiment, the dynamic characteristic learning is performed after the static characteristic learning, and further the delay learning is performed. An overall operation example which performs the angle estimating based on these learning results will be described with reference to a flowchart of FIG. 12.

At first, when the ignition key is turned "ON", the angle detection is performed and the motor torque is calculated (Step S1), and it is judged whether the calculated static characteristic compensation value is within the approximate value range of the nominal value as shown in FIG. 9, or not (Step S2). In the example of FIG. 9, the compensation values A1 and A2 are out of the range, and the compensation values B1 and B2 are within the range. In a case that it is judged that the compensation value is out of the approximate value range, the learning of the nonlinear element static characteristic map 142 is performed (Step S10), and the above learning is continued until the learning is completed (Step S20). When the static characteristic map can sufficiently be learned (for example, FIG. 6) to the motor torque region of the electric power steering apparatus, the learning is completed. After completing the learning of the nonlinear element static characteristic map 142, the learning of the nonlinear element dynamic characteristic map 151 (Step S30) and the learning of the nonlinear element delay characteristic map 152 (Step S50) are performed in parallel.

Figure 12:
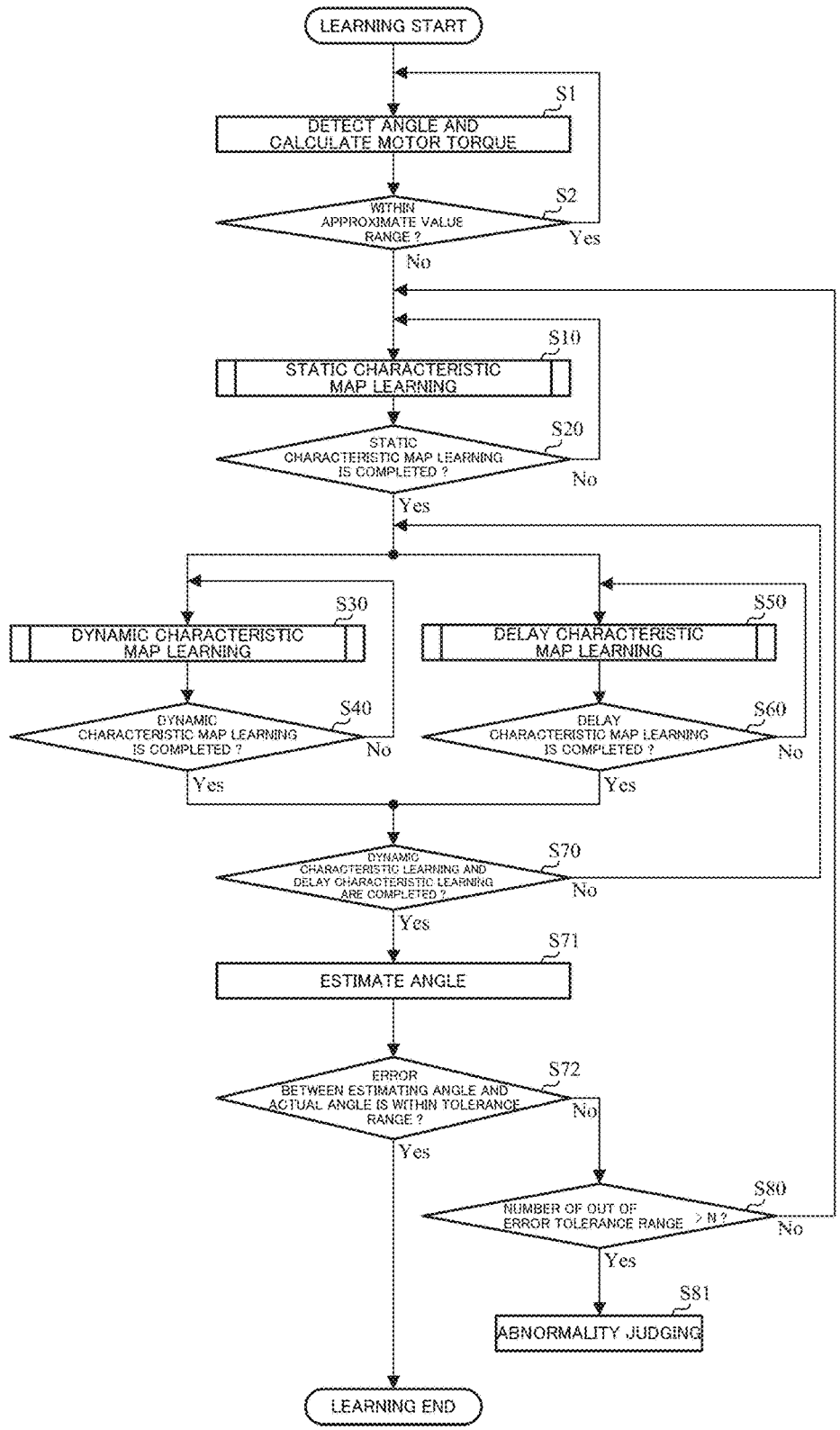
FIG. 12 is a flowchart showing an example of a learning method with reference to the nonlinear elements.

In the learning of the nonlinear element dynamic characteristic map 151 (Step S30) and the learning of the nonlinear element delay characteristic map 152 (Step S50), it is also judged whether the compensation values are respectively within the approximate value ranges of the nominal values as shown in FIG. 10 and FIG. 11, or not. When the respective characteristic compensation values are out of the approximate value ranges, the learning is performed. However, these judgements are omitted, and the learning may be performed. In the flowchart of FIG. 12, in order to avoid the figure being complicated, the judgement operation of the approximate value ranges is omitted.

Normally, after learning the nonlinear element dynamic characteristic map 151, the learning of the nonlinear element delay characteristic map 152 is performed. The learning of the nonlinear element dynamic characteristic map 151 (Step S30) is continued until the learning is completed (for example, FIG. 7) (Step S40). The learning of the nonlinear element delay characteristic map 152 (Step S50) is continued until the learning is completed (for example, FIG. 8) (Step S60). The learning is completed when the dynamic characteristic map 151 can sufficiently learned for the region of the motor angular velocity ω of the electric power steering apparatus. The learning is also completed when the delay characteristic map 152 can sufficiently learned for the region of the motor torque Tma.

When all of the map learning, which are the learning of the nonlinear element dynamic characteristic map 151 and the nonlinear element delay characteristic map 152, are completed (Step S70), the compensation value map is created, the angle compensation value MP is calculated by adding the compensation value CMd from the dynamic characteristic compensating section 150 to the compensation value CMs from the static characteristic compensating section 140 at the adding section 131, and the estimating angle is estimated based on the angle compensation value MP (Step S71). The steering shaft estimating angle SSe is calculated by subtracting the angle compensation value MP from the motor shaft angle Am, and the motor shaft estimating angle MSe is calculated by adding the angle compensation value MP to the steering shaft angle Ap. Then, it is diagnosed whether the errors (absolute values) between the estimating angles and the actual measuring values are within the tolerance range ε or not in accordance with the above Equation 1 or not (Step S72), and the learning is completed when the errors are within the tolerance range ε. In a case that the errors are larger than the tolerance range ε, it is judged whether the iteration number is "N" times (for example, three times) or not (Step S80), and in a case that the iteration number is less than "N" times, the process is returned to the above Step S10 and the above process is repeated.

At the above Step S80, in a case that the iteration number is "N" times, it is judged that the nonlinear elements or the sensor system is abnormal (Step S81). A setting of the iteration number "N" of the above Step S80 can appropriately be changeable.

By learning iteratively, the accuracy of the steering shaft estimating angle SSe and the motor shaft estimating angle MSe can be higher, and it is possible to deal with the environment variation such as the temperature and the aging deterioration of the mechanism components. Although the present embodiment deals with the environment variation such as the temperature by learning iteratively, a temperature sensor is provided additionally, and the values of respective maps may be corrected depending on the detection temperature.

Required input signals in the above learning are the motor torque Tm, the motor angular acceleration αm, the motor angular velocity ωm, the motor shaft angle Am and the steering shaft angle Ap.

Next, the learning of the nonlinear element static characteristic map 142 at the above Step S10 will be described.

Figure 13:
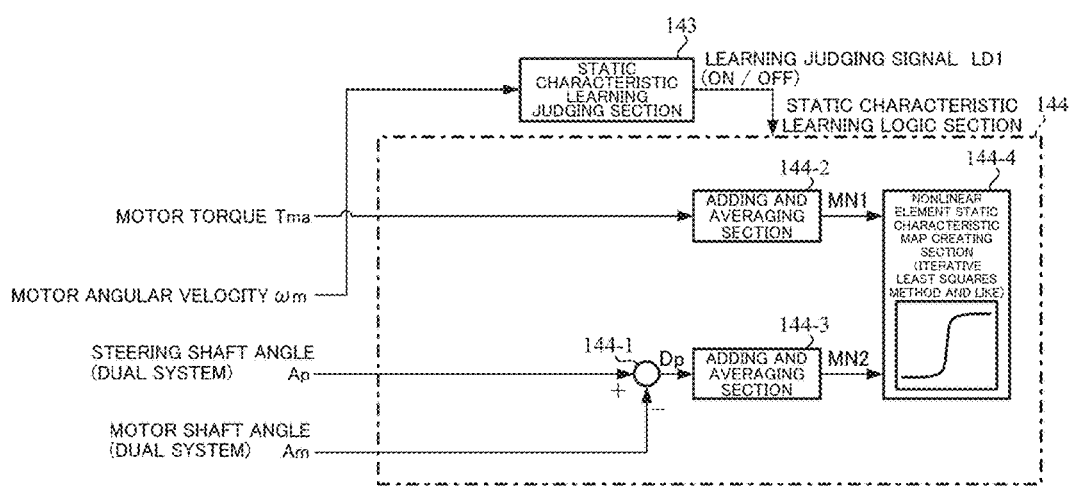
FIG. 13 is a block diagram showing a configuration example of a learning section of the static characteristic map.

As shown in FIG. 6, the horizontal axis is the motor torque Tm, and the vertical axis is the compensation value CMs being an angle deviation between the motor shaft angle Am and the steering shaft angle Ap in the nonlinear element static characteristic map 142. The configuration of the nonlinear element static characteristic map 142 comprises a static characteristic learning judging section 143 and a static characteristic learning logical section 144, for example as shown in FIG. 13.

The motor angular velocity ωm is inputted into the static characteristic learning judging section 143, and the static characteristic learning judging section 143 outputs a learning judging signal LD1 ("ON" or "OFF") in accordance with the judging described below. The static characteristic learning logical section 144 comprises a subtracting section 144-1, adding and averaging sections 144-2 and 144-3, and a nonlinear element static characteristic map creating section 144-4. The noise-removed motor torque Tma which is removed from the noise in the LPF 141 is inputted into the adding and averaging section 144-2. The steering shaft angle Ap and the motor shaft angle Am are inputted into the subtracting section 144-1, and the angle error is inputted into the adding and averaging section 144-3. The learning judging signal LD1 is inputted into the static characteristic learning logical section 144, and adding and averaging values MN1 and MN2, which are calculated in the adding and averaging sections 144-1 and 144-2, respectively, are inputted into the nonlinear element static characteristic map creating section 144-4.

In such a configuration, the operation example (the static characteristic map learning) will be described with reference to the flowchart of FIG. 14.

Figure 15:
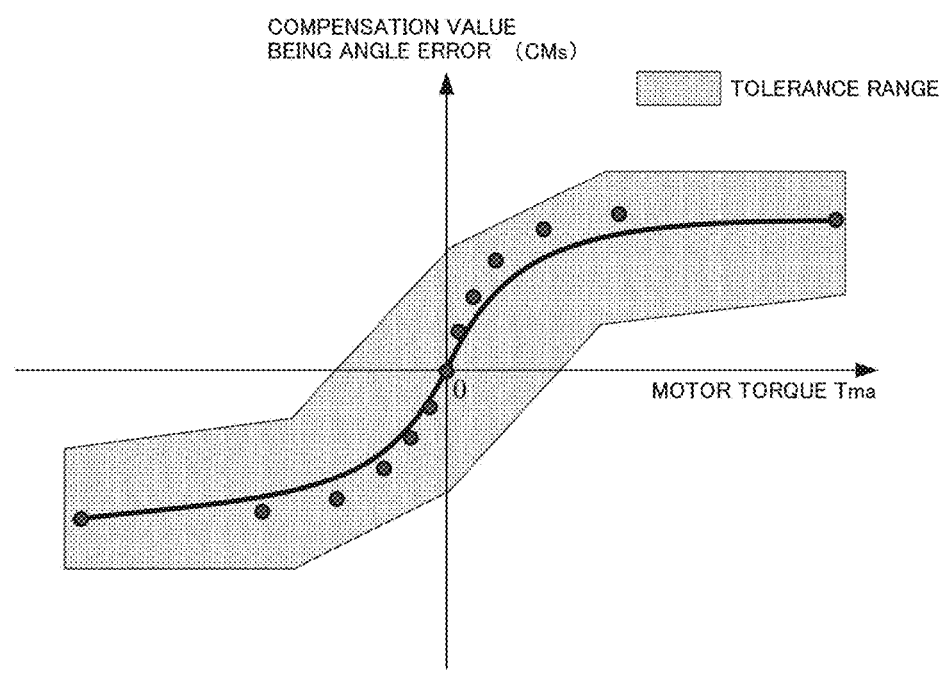
FIG. 15 is a graph showing a characteristic example and a tolerance range of the static characteristic map (learning completed) of the nonlinear elements.

When the handle is in the steering holding state or is the slow steering which is equal to or less than 5 [deg/s] (the motor angular velocity ωm is an almost zero state), that is, when the static characteristic learning judging section 143 judges that the motor angular velocity ωm is an almost zero state and turns-"ON" the learning judging signal LD1, and the learning judging signal LD1 which indicates "ON" is inputted into the static characteristic learning logical section 144, the static characteristic learning of the static characteristic learning logical section 144 starts (Step S11). When the learning is started, the deviation Dp between the steering shaft angle Ap and the motor shaft angle Am is calculated in the subtracting section 144-1 (Step S12). The deviation Dp is inputted into the adding and averaging section 144-3, and the adding and averaging value MN2 is calculated in the adding and averaging section 144-3 (Step S13). The noise-removed motor torque Tma from the LPF 141 is also inputted into the adding and averaging section 144-2, and the adding and averaging value MN1 is calculated in the adding and averaging section 144-2 (Step S14). The calculating order of the adding and averaging values MN1 and MN2 may be changeable. The adding and averaging values MN1 and MN2 are inputted into the nonlinear element static characteristic map creating section 144-4 (corresponding to the nonlinear element static characteristic map 142 of FIG. 5), and it is judged whether the error between the actual measuring value and the estimating value is converged within the tolerance range (a shaded area) of FIG. 15 or not by using a calculating method such as an iterative least squares method or the like (Step S14). In a case that the error is converged within the tolerance range, the nonlinear element static characteristic map 144-4 is updated (Step S15).

In a case that the error between the actual measuring value and the estimating value is not converged within the tolerance range, the process is returned to the Step S11 and the above process is iterated until the iteration number is larger than a predetermined times "N1" (for example, five times) (Step S16). In a case that the error between the actual measuring value and the estimating value is not converged within the tolerance range after the learning is iterated for "N1" times, it is judged whether the information of the respective dual-system sensors is the same or not, that is, it is judged whether the detection values of the dual-system steering shaft angle sensor 64 are the same or not and whether the detection values of the dual-system motor shaft angle sensor 67 are the same or not (Step S17). When the detection values of the respective dual-system sensors are the same, it is judged that the nonlinear elements are abnormal since the sensor system is not abnormal (Step S17A). In a case that the detection values of the respective dual-system sensors are not the same, it is judged that the sensor system is abnormal (Step S17B).

Thus, when the steering holding state or the slow steering is continued for a constant time, the nonlinear element static characteristic map 142 is updated by using the calculating method such as the iterative least squares method. When the static characteristic map can sufficiently be learned to the motor torque region of the electric power steering apparatus, the learning is completed.

Next, the learning of the dynamic characteristic map at the above Step S30 will be described.

As shown in FIG. 7, the horizontal axis is the motor angular velocity ωm, and the vertical axis is the compensation value CMy being an angle deviation between the motor shaft angle Ams (after the static characteristic compensation) and the steering shaft angle Ap in the dynamic characteristic map. The configuration of the nonlinear element dynamic characteristic map 151 is shown, for example, in FIG. 16.

The motor angular acceleration αm is inputted into the dynamic characteristic learning judging section 145, the motor torque Tm is inputted into the dynamic characteristic learning judging section 145 and the nonlinear element static characteristic map 146-1 via the LPF 141. The dynamic characteristic learning judging section 145 outputs a learning judging signal LD2 ("ON" or "OFF") when a predetermined condition (the motor angular acceleration αm is almost zero and the motor torque Tm (Tma) is large to some degree) is satisfied. The dynamic characteristic learning logical section 146 comprises the nonlinear element static characteristic map 146-1, an adding section 146-2, a subtracting section 146-3, adding and averaging sections 146-4 and 146-5, and a nonlinear element dynamic characteristic map creating section 146-6 (corresponding to the nonlinear element dynamic characteristic map 151 in FIG. 5). The motor angular velocity ωm is inputted into the adding and averaging section 146-4, the steering shaft angle Ap is adding-inputted into the subtracting section 146-3, and the motor shaft angle Am is inputted into the adding section 146-2. The compensation value CMs from the nonlinear element static characteristic map 146-1 is inputted into the adding section 146-2, and the added value (the motor shaft angle after the static characteristic compensation) Ams is subtracting-inputted into the subtracting section 146-3. A deviation Dm (=Ap−Ams), which is calculated in the subtracting section 146-3, is inputted into the adding and averaging section 146-5. The learning judging signal LD2 is inputted into the dynamic characteristic learning logical section 146, and the adding and averaging values MN3 and MN4, which are calculated in the adding and averaging sections 146-4 and 146-5, respectively, are inputted into the dynamic characteristic map creating section 146-6.

In such a configuration, the operation example (the dynamic characteristic map learning) will be described with reference to the flowchart of FIG. 17.

When the motor angular acceleration αm is almost zero, the worm gear is tightly engaged with the motor gear (the noise-removed motor torque Tma from the LPF 141 is large to some degree), the learning judging signal LD2 is turned "ON" and is inputted into the dynamic characteristic learning logical section 146, and the dynamic characteristic learning of the dynamic characteristic learning logical section 146 is started (Step S31). When the learning is started, the noise-removed motor torque Tma from the LPF 141 is inputted into the nonlinear element static characteristic map 146-1, and the static characteristic compensation is performed (Step S32). The compensation value CMs of the static characteristic compensation is inputted into the adding section 146-2, the added value Ams, which is added the motor shaft angle Am after the static characteristic compensation to the compensation value CMs, is calculated and is subtracting-inputted into the subtracting section 146-3. The deviation Dm (=Ap−Ams) between the steering shaft angle Ap and the added value Ams is calculated in the subtracting section 146-3 (Step S33), and is inputted into the adding and averaging section 146-5. The adding and averaging value MN4 is calculated in the adding and averaging section 146-5 (Step S34).

Figure 18:
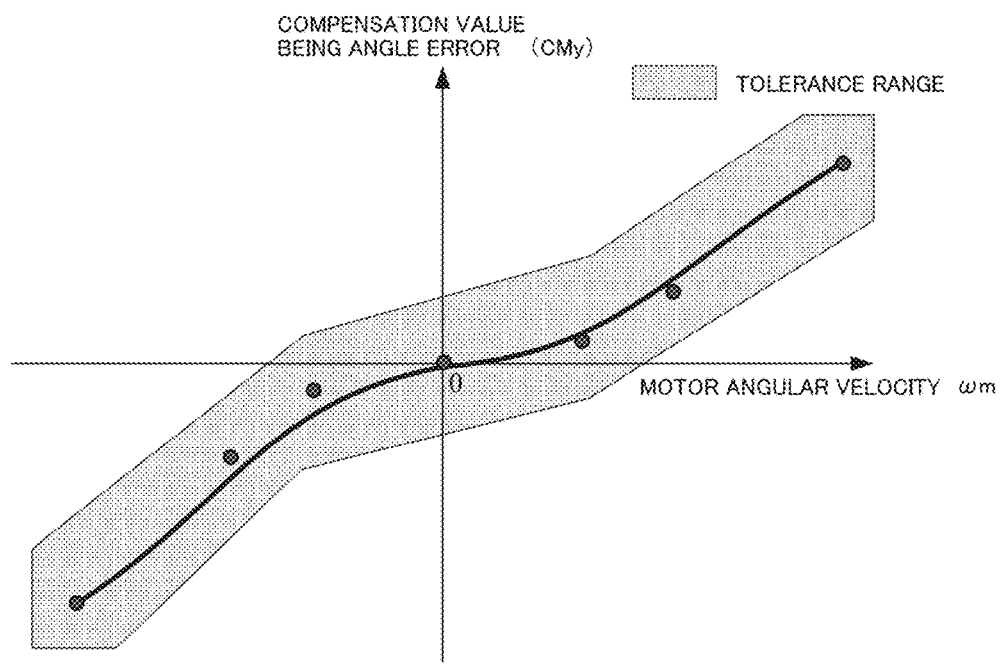
FIG. 18 is a graph showing a characteristic example and a tolerance range of the dynamic characteristic map (learning completed) of the nonlinear elements.

The motor angular velocity ωm is also inputted into the adding and averaging section 146-4, and the adding and averaging value MN3 is calculated in the adding and averaging section 146-4 (Step S35). The calculation order of the adding and averaging values MN3 and MN4 may be changeable. The adding and averaging values MN3 and MN4 are inputted into the nonlinear element dynamic characteristic map creating section 146-6, and it is judged whether the error between the actual measuring value and the estimating value is converged within the tolerance range (the shaded area) of FIG. 18 or not by using the calculating method such as the iterative least squares method or the like (Step S35). In a case that the error is converged within the tolerance range, the nonlinear element dynamic characteristic map 146-6 is updated (Step S36).

In a case that the error between the actual measuring value and the estimating value is not converged within the tolerance range, the process is returned to the Step S31 and the above process is iterated until the iteration number is larger than a predetermined times "N2" (for example, five times) (Step S37). In a case that the error between the actual measuring value and the estimating value is not converged within the tolerance range after the learning is iterated for "N2" times, it is judged whether the detection values of the dual-system sensors are the same or not, that is, it is judged whether the detection values of the dual-system steering shaft angle sensor 64 are the same or not and whether the detection values of the dual-system motor shaft angle sensor 67 are the same or not (Step S38). When the detection values of the respective dual-system sensors are the same, it is judged that the nonlinear elements are abnormal since the sensor system is not abnormal (Step S38A). Then, in a case that the detection values of the respective dual-system sensors are not the same, it is judged that the sensor system is abnormal (Step S38B).

Thus, when the dynamic characteristic map can sufficiently be learned for the motor angular velocity region of the electric power steering apparatus, the learning is completed. Black spots in FIG. 18 denote the learned compensation value CMy.

Next, the learning of the delay characteristic map at the Step S50 in FIG. 12 will be described.

As shown in FIG. 8, the horizontal axis is the motor torque Tma, and the vertical axis is the compensation value CMd being a phase deviation between the motor shaft angle Ams (after the static characteristic compensation) and the steering shaft angle Ap. The configuration of the delay characteristic map is shown, for example, in FIG. 19.

The noise-removed motor torque Tma via the LPF 141 is inputted into a delay characteristic learning judging section 147 and the nonlinear element static characteristic map 148-1. The learning judging signal LD3 ("ON" or "OFF") is outputted from the delay characteristic learning judging section 147 when a predetermined condition (when the motor torque Tm (Tma) is equal to or less than a predetermined value) is satisfied. The learning judging signal LD3 is inputted into a delay characteristic learning logical section 148.

The delay characteristic learning logical section 148 comprises the nonlinear element static characteristic map 148-1 (the map 146-1 in FIG. 16), an adding section 148-2, a subtracting section 148-3, an adding and averaging section 148-5, a multi delay section 148-4, a cross correlation section 148-6 and a nonlinear element delay characteristic map creating section 148-7. The motor torque Tm is inputted into the adding and averaging section 148-5, the motor angular velocity ωm is inputted into the multi delay section 148-4, and the multi delay output MD is inputted into the cross correlation section 148-6. The steering shaft angle Ap is adding-inputted into the subtracting section 148-3, and the motor shaft angle Am is inputted into the adding section 148-2. The compensation value CMs from the nonlinear element static characteristic map 148-1 is inputted into the adding section 148-2, and the added value (the motor shaft angle after the static characteristic compensation) Ams is subtracting-inputted into the subtracting section 148-3. A deviation Dd, which is calculated in the subtracting section 148-3, is inputted into the cross correlation section 148-6. The cross correlation section 148-6 performs a cross correlation process based on the multi delay output MD from the multi delay section 148-4 and the deviation Dd, and searches a delay time which the correlation is the highest. Since the cross correlation analyzes similarity of two input signals, a certain amount of analysis time is required.

Figure 21A:
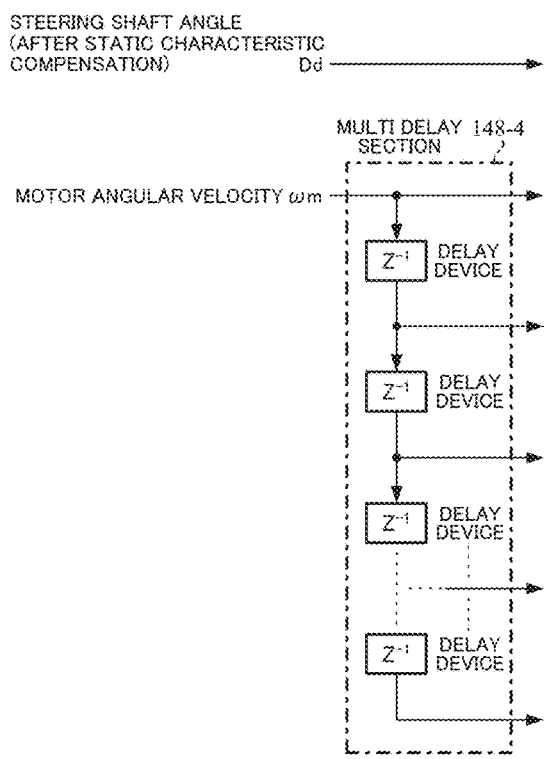
FIG. 21A and FIG. 21B are timing charts showing an operation example of a multi delay section.
Figure 21B:
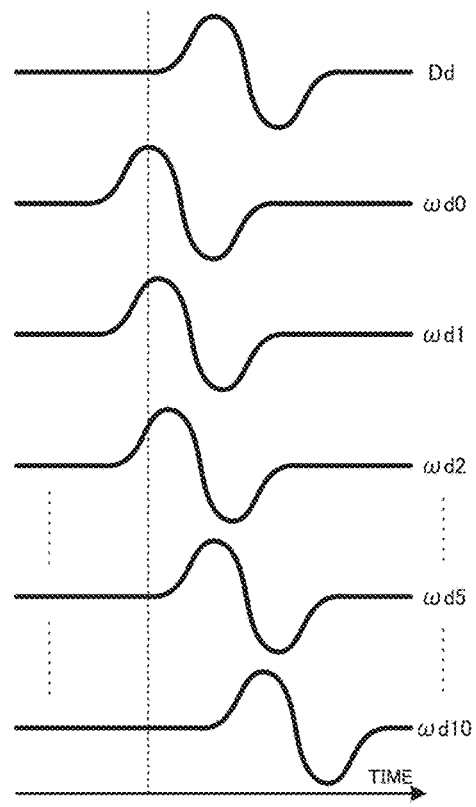
Figure 22A:
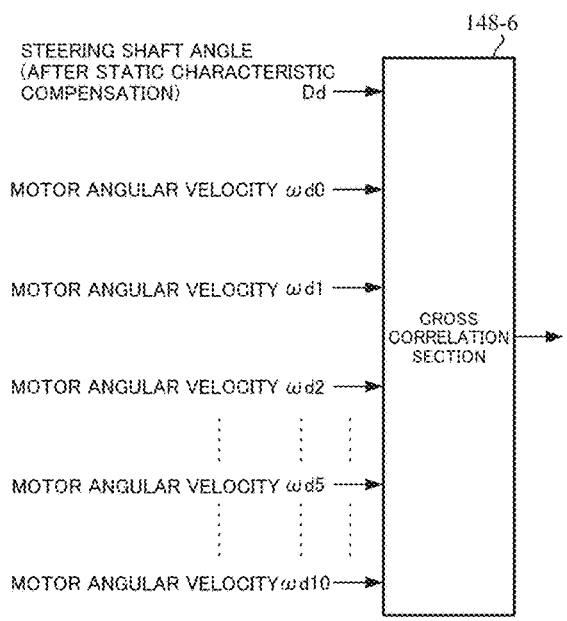
FIG. 22A and FIG. 22B are input-output relationship diagrams showing a process example of a cross correlation section.
Figure 22B:
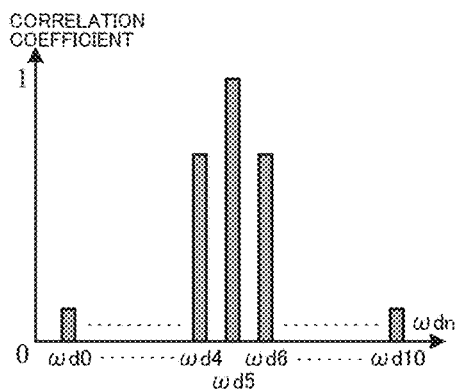

FIG. 21A and FIG. 21B show an operation example of the multi delay section 148-4, and the multi delay section 148-4 outputs the multi delay motor angular velocities ωd0, ωd1, . . . , ωd10 which have respective predetermined delay times by each of delay devices ($Z^{-1}$) to the input of the motor angular velocity ωm. The multi delay motor angular velocities MD (ωd0 to ωd10), which are outputted from the multi delay section 148-4, and the pinion shaft angle (after the static characteristic compensation) Dd are inputted into the cross correlation section 148-6. As shown in FIG. 22A and FIG. 22B, the cross correlation section 148-6 calculates the correlation functions by using the pinion shaft angle Dd as a reference signal and the multi delay motor angular velocities MD (ωd0 to ωd10) from the multi delay section 148-4, and the delay time of the multi delay device having the largest correlation is reflected to the map.

A learning judging signal LD3 is inputted into the delay characteristic learning logical section 148, an adding and averaging value MN5 which is calculated in the adding and averaging section 148-5, and the cross correlation value ML which is the output of the cross correlation section 148-6 are also inputted into the nonlinear element delay characteristic map creating section 148-7.

Figure 23:
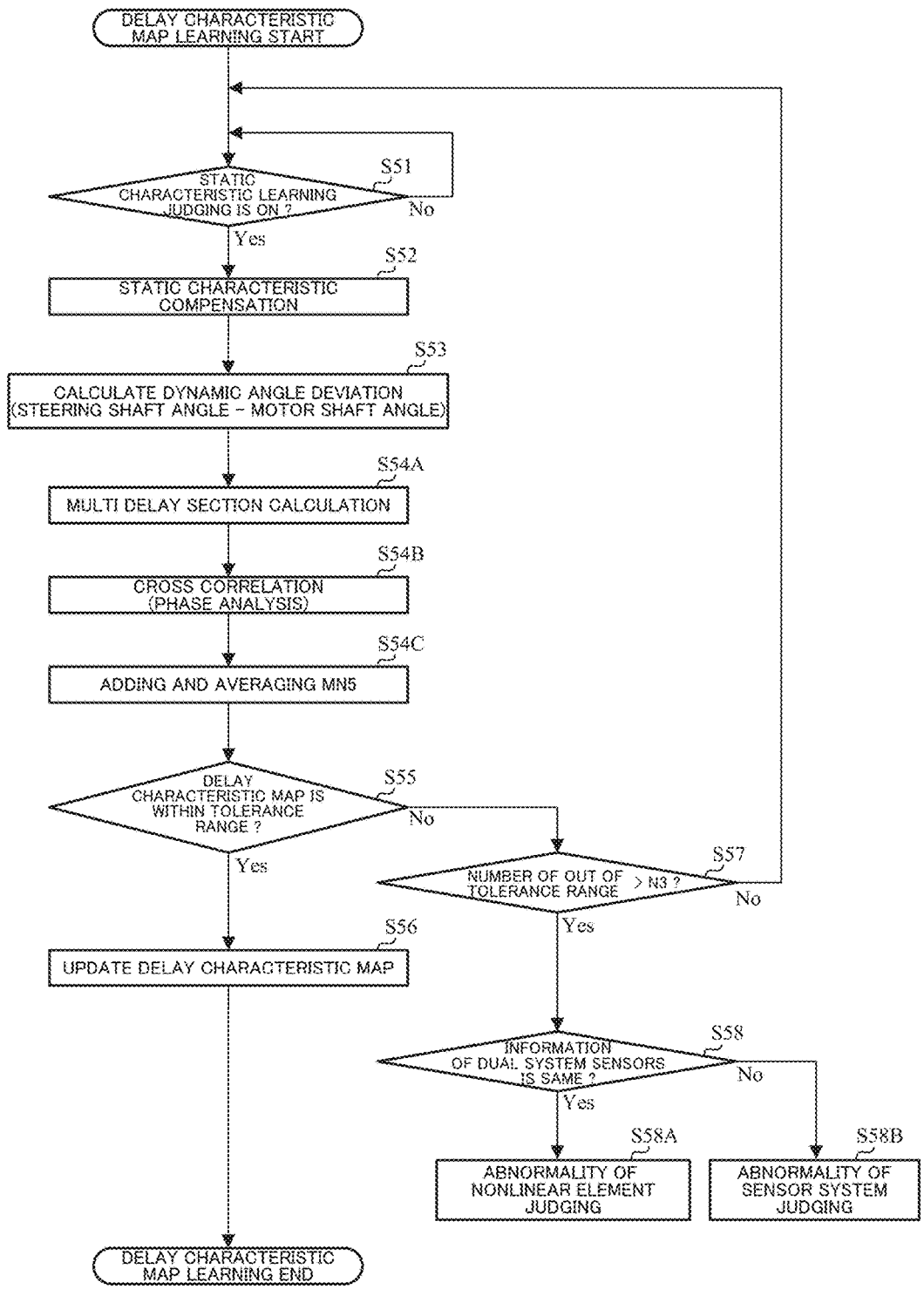
FIG. 23 is a flowchart showing a learning operation example of the delay characteristic map.

In such a configuration, the operation example will be described with reference to a flowchart of FIG. 23.

In a region which the motor torque Tma (or Tm) is small, since an influence of the backlash is large, the delay time is long. On the other hand, in a region which the motor torque Tma (or Tm) is large, since the worm gear is tightly engaged with the motor gear, the delay time is short. Thus, when the motor torque Tma (or Tm) is equal to or smaller than a predetermined value in accordance with the above condition, the learning judging signal LD3 is turned "ON" and is inputted into the delay characteristic learning logic section 148, and the delay characteristic learning of the delay characteristic learning logic section 148 is started from this time (Step S51).

When the learning is started, the noise-removed motor torque Tma from the LPF 141 is inputted into the nonlinear element static characteristic map 148-1, and the static characteristic compensation by means of the nonlinear element static characteristic map 148-1 is performed (Step S52). The compensation value CMs of the static characteristic compensation is inputted into the adding section 148-2. An added value (the motor shaft angle after the static characteristic compensation) Ams, which is added the motor shaft angle Am to the compensation value CMs, is subtracting-inputted into the subtracting section 148-3, and the deviation Dd, which is subtracted the added value Ams from the steering shaft Ap, is calculated in the subtracting section 148-3 (Step S53), and is inputted into the cross correlation section 148-6. The motor angular velocity ωm is inputted into the multi delay section 148-4, and the multi delay section 148-4 calculates the plural multi delay motor angular velocities MD (ωd0 to ωd10) which have a different delay time (Step S54A). The multi delay motor angular velocities MD are inputted into the cross correlation section 148-6, and the cross correlation process is performed (Step S54B). The cross correlation section 148-6 searches the delay time that the correlation is the largest among the plural multi delay motor angular velocities of which the delay amounts are different, and outputs the correlation coefficients ML.

Figure 20:
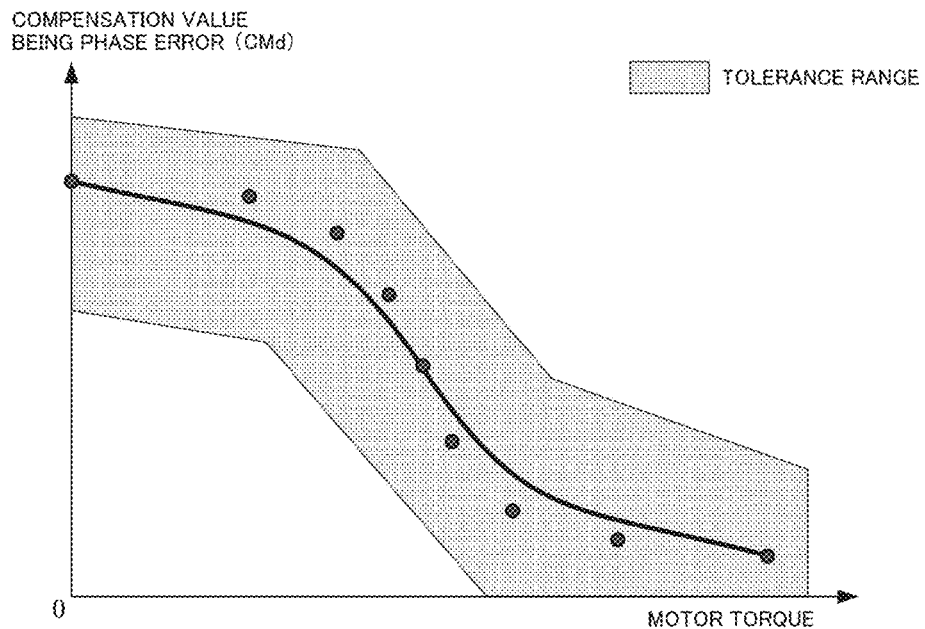
FIG. 20 is a graph showing a characteristic example and a tolerance range of the delay characteristic map (learning completed) of the nonlinear elements.

Further, the motor torque Tma from the LPF 141 is inputted into the adding and averaging section 148-5, and the adding and averaging value MN5 is calculated (Step S54C). The calculation order of the adding and averaging value MN5 and the correlation coefficients ML may be changeable. The adding and averaging value MN5 and the correlation coefficients ML are inputted into the nonlinear element delay characteristic map creating section 148-7, and it is judged whether the error between the actual measuring value and the estimating value is converged within the tolerance range (the shaded area) of FIG. 20 or not by using the calculating method such as the iterative least squares method or the like (Step S55). In a case that the error is converged within the tolerance range, the nonlinear element delay characteristic map 148-7 is updated (Step S56).

In a case that the error between the actual measuring value and the estimating value is not converged within the tolerance range, the process is returned to the Step S51 and the above process is iterated until the iteration number is larger than a predetermined times "N3" (for example, five times) (Step S57). In a case that the error between the actual measuring value and the estimating value is not converged within the tolerance range after the learning is iterated for "N3" times, it is judged whether the detection values of the dual-system sensors are the same or not, that is, it is judged whether the detection values of the dual-system steering shaft angle sensor 64 are the same or not and whether the detection values of the dual-system motor shaft angle sensor 67 are the same or not (Step S58). When the detection values of the respective dual-system sensors are the same, it is judged that the nonlinear elements are abnormal since the sensor system is not abnormal (Step S58A). In a case that the detection values of the respective dual-system sensors are not the same, it is judged that the sensor system is abnormal (Step S58B).

As described above, when the delay characteristic map can sufficiently be learned for the motor torque region of the electric power steering apparatus, the learning is completed. Black spots in FIG. 20 denote the learned compensation value CMd.

Figure 16:
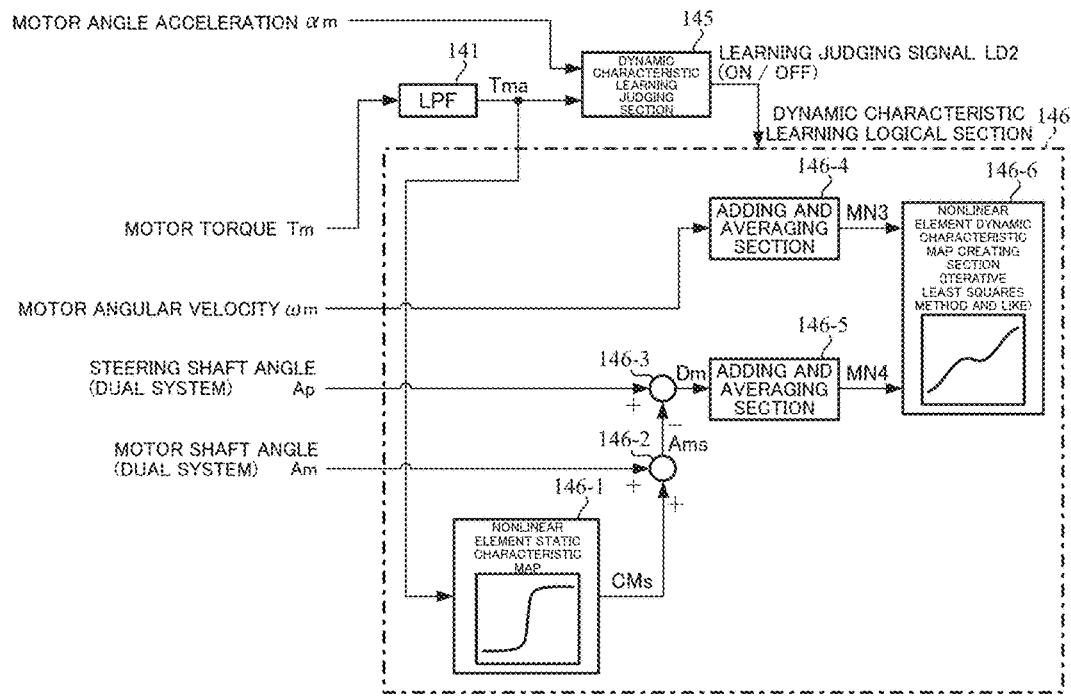
FIG. 16 is a block diagram showing a configuration example of a learning section of the dynamic characteristic map.
Figure 19:
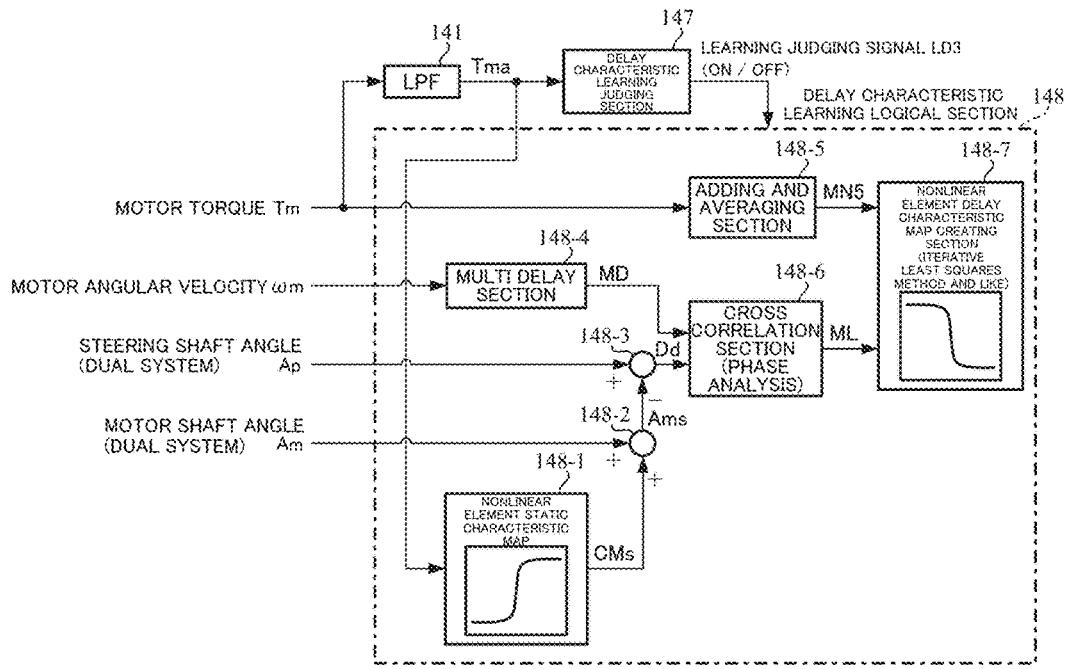
FIG. 19 is a block diagram showing a configuration example of a learning section of the delay characteristic map.

As well, the static characteristic map 142 of FIG. 5 is corresponding to the static characteristic map creating section 144-4 of FIG. 13, the dynamic characteristic map 151 of FIG. 5 is corresponding to the dynamic characteristic map creating section 146-6 of FIG. 16, and the delay characteristic map 152 of FIG. 5 is corresponding to the delay characteristic map creating section 148-7 of FIG. 19. FIG. 5 shows the maps which the learning of the respective characteristics is completed, and FIG. 13, FIG. 16 and FIG. 19 show the maps during the learning. In this connection, the maps are designated with different reference numerals.

Figure 24:
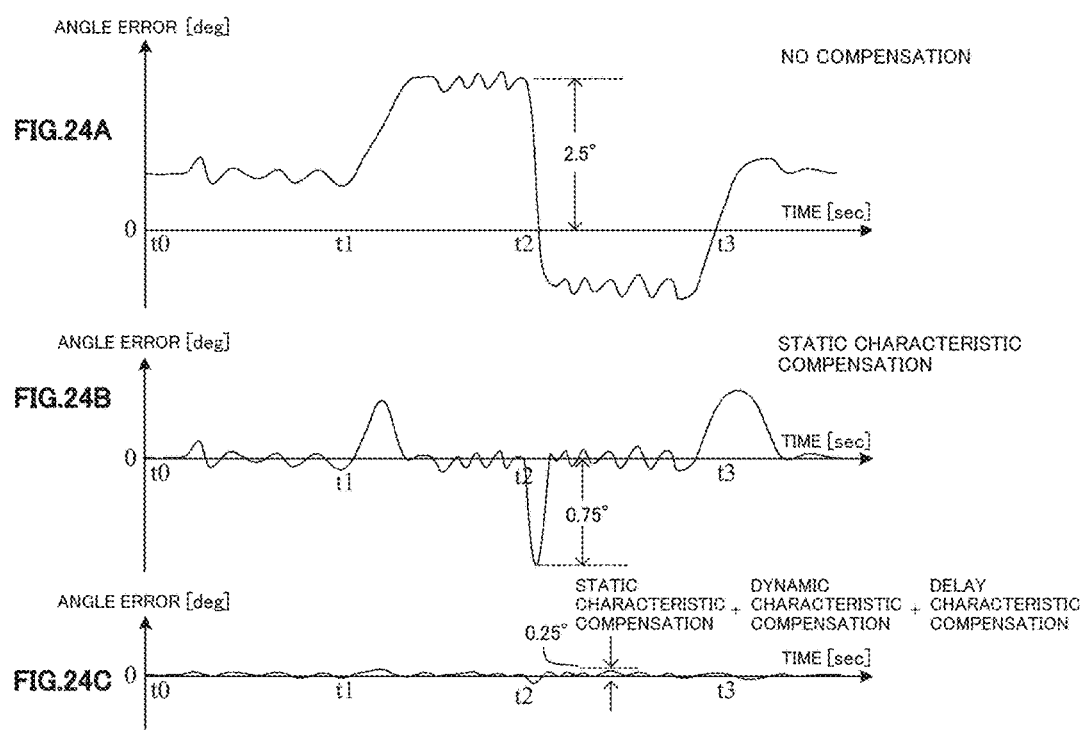
FIG. 24A, FIG. 24B, and FIG. 24C are characteristic diagrams explaining effects of the first embodiment of the present invention (in cases of the static characteristic compensation, and the static characteristic compensation and the dynamic characteristic compensation)

Next, the effect of the present invention (the first embodiment) will be described with reference to FIG. 24A, FIG. 24B and FIG. 24C.

The horizontal axis is the time and the vertical axis is the angle error (the difference between the motor shaft angle and the steering shaft angle). The state that the handle is steered to left or right around the handle center is shown at an interval from the time point t0 to the time point t1. The state that the handle is steered near the left-side end and then is steered to left or right is shown at the interval from the time point t1 to the time point t2. The state that the handle is steered near the right-side end and then is steered to left or right is shown at the interval from the time point t2 to a time point t3. The state that the handle is returned to the center is shown after the time point t3. As shown in FIG. 24A, in a case that the compensation is not performed, the angle difference is large (2.5°). As shown in FIG. 24B, by performing the static characteristic compensation, the angle difference is reduced (0.75°) to the motion that the handle is steered in the low speed. Further, as shown in FIG. 24C, by appending the dynamic characteristic compensation, the angle difference can be reduced (0.25°) to even the motion that the handle is steered in the high speed.

Figure 25:
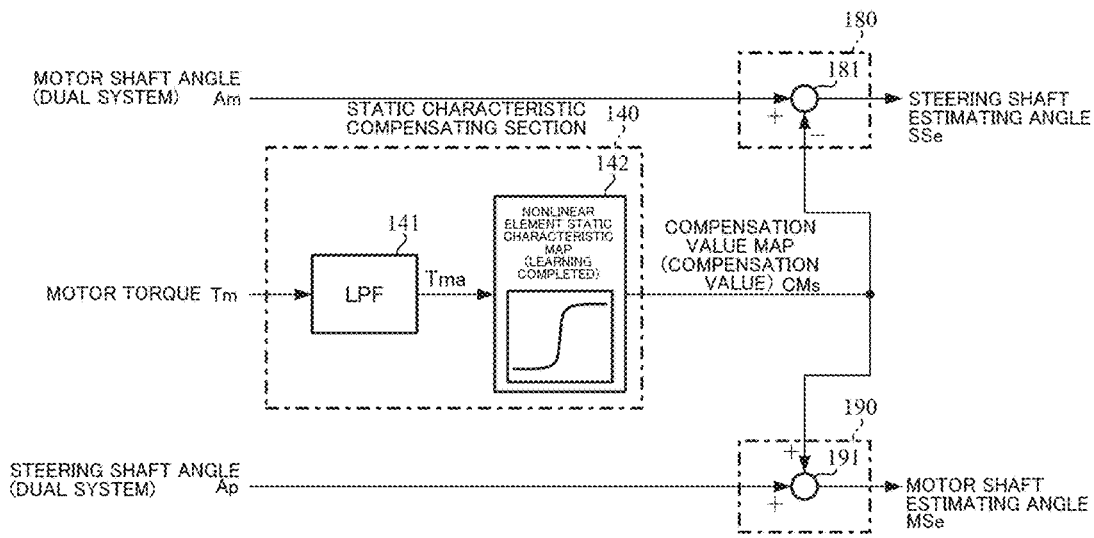
FIG. 25 is a block diagram showing a configuration example of the second embodiment of the present invention.

In the above-described first embodiment, as shown in FIG. 5, the compensations of the static characteristic, the dynamic characteristic and the delay characteristic are performed. However, the compensation of the static characteristic may only be performed in a configuration shown in FIG. 25 (the second embodiment).

The static characteristic compensating section 140 that calculates the compensation value CMs comprises the low pass filter (LPF) 141 to input the motor torque Tm, and the nonlinear element static characteristic map (learning completed) 142 to input the noise-removed motor torque Tma which is removed from the high frequency noise in the LPF 141, and outputs the compensation value CMs (or the compensation map in learning).

As well as the first embodiment, the compensation value CMs is subtracting-inputted into a subtracting section 181 and is adding-inputted into an adding section 191. The subtracting section 181 outputs the steering shaft estimating angle SSe, and the adding section 191 outputs the motor shaft estimating angle MSe. Then, it is diagnosed whether the errors (absolute values) between the steering shaft estimating angle SSe and the motor shaft estimating angle MSe and the respective actual measuring values are within the tolerance range ε or not, and the learning is repeated until the errors are within the tolerance range ε. The learning is completed at the time when the errors are within the tolerance range ε.

As shown in FIG. 6, the nonlinear element static characteristic map 142 has the characteristic, which the compensation value (CMs) that is the angle error gradually and nonlinearly becomes larger, when the motor torque Tm is larger from Tm1 (=0) in a positive or negative direction. The compensation value (CMs) steeply increases or decreases near the motor torque Tm1 (=0).

The learning of the nonlinear element static characteristic map 142 is corresponding to creating the map. As the map is learned in the wide range (for example, from one (the positive side) of the rack end neighborhood to the other (the negative side) of the rack end neighborhood) against the horizontal axis (the motor torque Tm), the error becomes small. That is, it is meaningless that the learning is only a particular point (for example, in FIG. 6, near a point $s_5$ (Tm1=0, CMs=0)). Since the point numbers of the map are depending on capacities of the RAM and the ROM of the microcomputer, and the arithmetic speed of the CPU, it cannot be concluded against the point numbers of the map. When the point numbers which are some extent range are covered against the horizontal axis, it is judged that the learning is completed.

Figure 26:
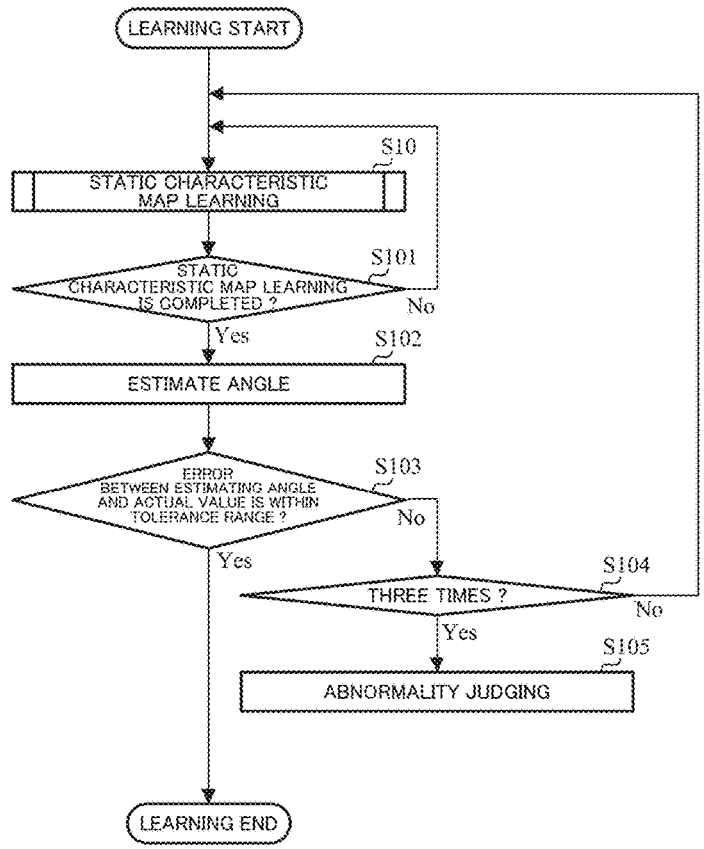
FIG. 26 is a flowchart showing an operation example of the second embodiment of the present invention.

An overall operation example which performs the angle estimating based on the learning and the learning result of the static characteristic will be described with reference to a flowchart of FIG. 26. Even in this case, the learning may be started by judging that the compensation value is out of the approximate value range of the nominal value, as shown in FIG. 9.

At first, the learning of the nonlinear element static characteristic map 142 is performed (Step S10), and the learning is continued until the learning is completed (Step S101). When the static characteristic map can sufficiently be learned (for example, FIG. 6) to the motor torque region of the electric power steering apparatus, the learning is completed. Since the compensation value map is created by completing the learning of the nonlinear element static characteristic map 142, the estimating angle is estimated based on the compensation value CMs from the static characteristic compensating section 140 (Step S102). The steering shaft estimating angle SSe is calculated by subtracting the compensation value CMs from the motor shaft angle Am. The motor shaft estimating angle MSe is calculated by adding the compensation value CMs to the steering shaft angle Ap. Then, it is diagnosed whether the errors (absolute values) between the estimating angles and the actual measuring values are within the tolerance range ε or not in accordance with the above Equation 1 or not (Step S103), and the learning is completed when the errors are within the tolerance range ε. In a case that the errors are larger than the tolerance range ε, it is judged whether the iteration number is for example, three times or not (Step S104), and in a case that the iteration number is equal to or less than twice, the process is returned to the above Step S10 and the above process is iterated.

At the above Step S104, in a case that the iteration number is three times, it is judged that the nonlinear elements or the sensor system is abnormal (Step S105). A setting of the iteration number of the above Step S104 can appropriately be changeable.

By learning iteratively, the accuracy of the steering shaft estimating angle SSe and the motor shaft estimating angle MSe can be higher, and it is possible to deal with an environment variation such as a temperature and aging deterioration of the mechanism components. Although the embodiment deals with the environment variation such as the temperature by learning iteratively, a temperature sensor is provided additionally, and the values of respective maps may be corrected depending on the detected temperature. The learning operation of the nonlinear element static characteristic map 142 at the above Step S10 is similar to that of FIG. 14.

Figure 27:
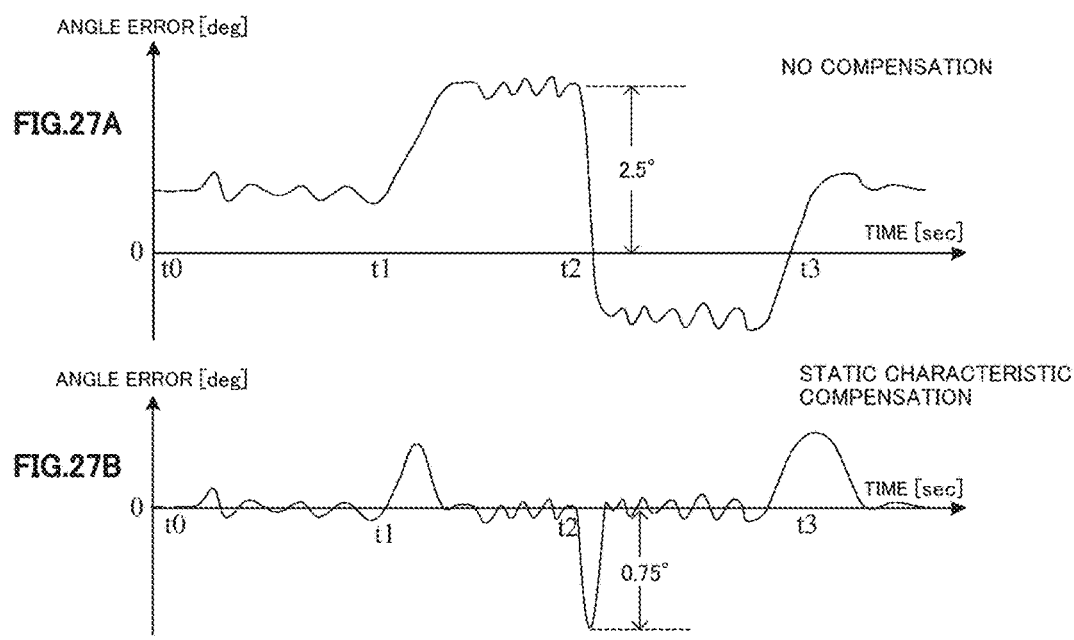
FIG. 27A and FIG. 27B are characteristic diagrams explaining effects of the second embodiment of the present invention (in cases of no compensation and the static characteristic compensation)

Next, the effect of the second embodiment will be described with reference to FIG. 27A and FIG. 27B.

The state that the handle is steered to left or right around the handle center is shown at an interval from a time point t0 to a time point t1. The state that the handle is steered near the left-side end and then is steered to left or right is shown at the interval from the time point t1 to a time point t2. The state that the handle is steered near the right-side end and then is steered to left or right is shown at the interval from the time point t2 to a time point t3. The state that the handle is returned to the center is shown after the time point t3. As shown in FIG. 27A, in a case that the compensation is not performed, the angle difference is large (2.5°). As shown in FIG. 27B, by performing the static characteristic compensation, the angle difference is reduced (0.75°) to the motion that the handle is steered in the low speed.

Figure 28:
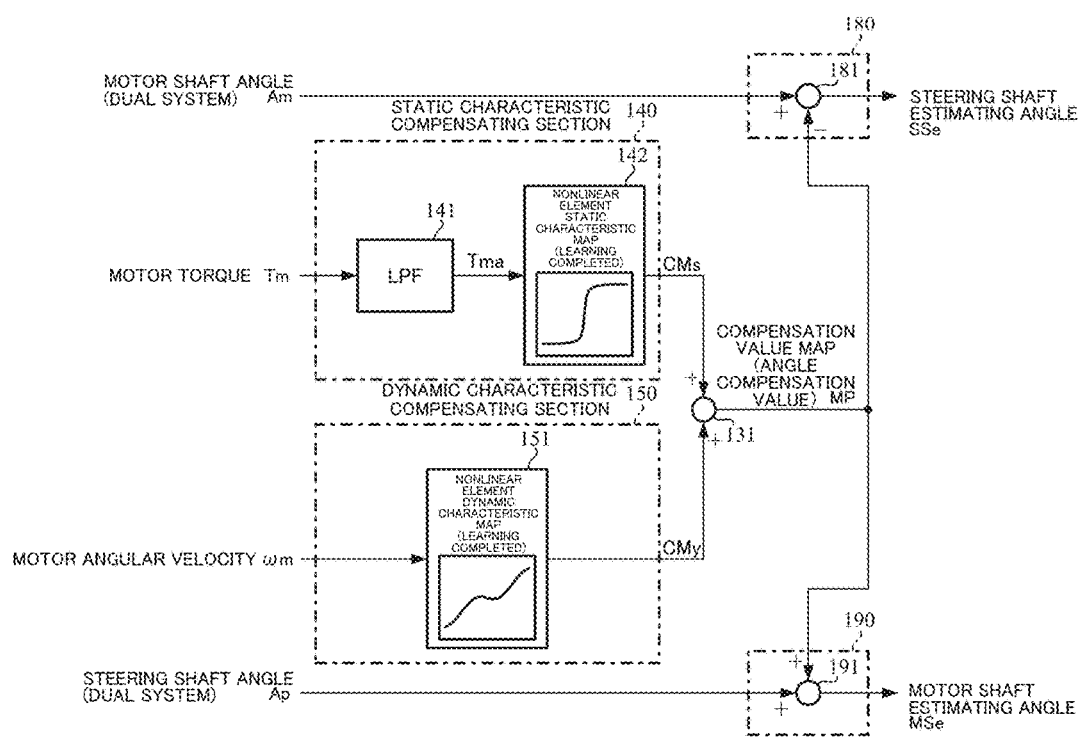
FIG. 28 is a block diagram showing a configuration example of the third embodiment of the present invention.

FIG. 28 shows a configuration example of the third embodiment which performs the static characteristic compensation and the dynamic characteristic compensation (no delay characteristic compensation). The nonlinear learning logical section 130 of the nonlinear elements comprises the static characteristic compensating section 140 to calculate the compensation value CMs, the dynamic characteristic compensating section 150 to calculate the compensation value CMy, and the adding section 131 to add the compensation value CMy to the compensation value CMs and output the angle compensation value MP. The static characteristic compensating section 140 comprises the low pass filter (LPF) 141 to input the motor torque Tm, and the nonlinear element static characteristic map (learning completed) 142 to input the noise-removed motor torque Tma which is removed from the high frequency noise in the LPF 141, and output the compensation value CMs. The dynamic characteristic compensating section 150 comprises the nonlinear element dynamic characteristic map 151 that inputs the motor angular velocity ωm and outputs the compensation value CMy. The compensation value CMy is added to the compensation value CMs in the adding section 131, and the added value is outputted as the final angle compensation value MP (the compensation value map in learning).

The angle compensation value MP is subtracting-inputted into the subtracting section 181, and is adding-inputted into the adding section 191 of the motor shaft angle estimating section 190. The subtracting section 181 outputs the steering shaft angle SSe, and the adding section 191 outputs the motor shaft angle MSe. Then, it is diagnosed whether the errors (absolute values) between the steering shaft estimating angle SSe and the motor shaft estimating angle MSe and the respective actual measuring values are within the tolerance range ε or not, in accordance with the above Equation 1, and the learning is repeated until the errors are within the tolerance range ε. The learning is completed at the time when the errors are within the tolerance range ε.

As well, in a case that both or one of inequalities in the Equation 1 is not satisfied even when iterating the learning, it is judged that one of the steering system and the sensor system is failed or is abnormal. The nonlinear element static characteristic map 142 has the characteristic shown in FIG. 6, and the nonlinear element dynamic characteristic map 151 has the characteristic shown in FIG. 7.

The learning of respective characteristic maps (142 and 151) is corresponding to creating the maps. In angle estimating of the respective components in the electric power steering apparatus, it is necessary to compensate the nonlinear elements such as the friction and the backlash of the mechanism system including the reduction mechanism 65 and the steering system. For performing the compensation, at least the static characteristic learning is requested, and the dynamic characteristic learning is preferably performed after the static characteristic learning.

Figure 29:
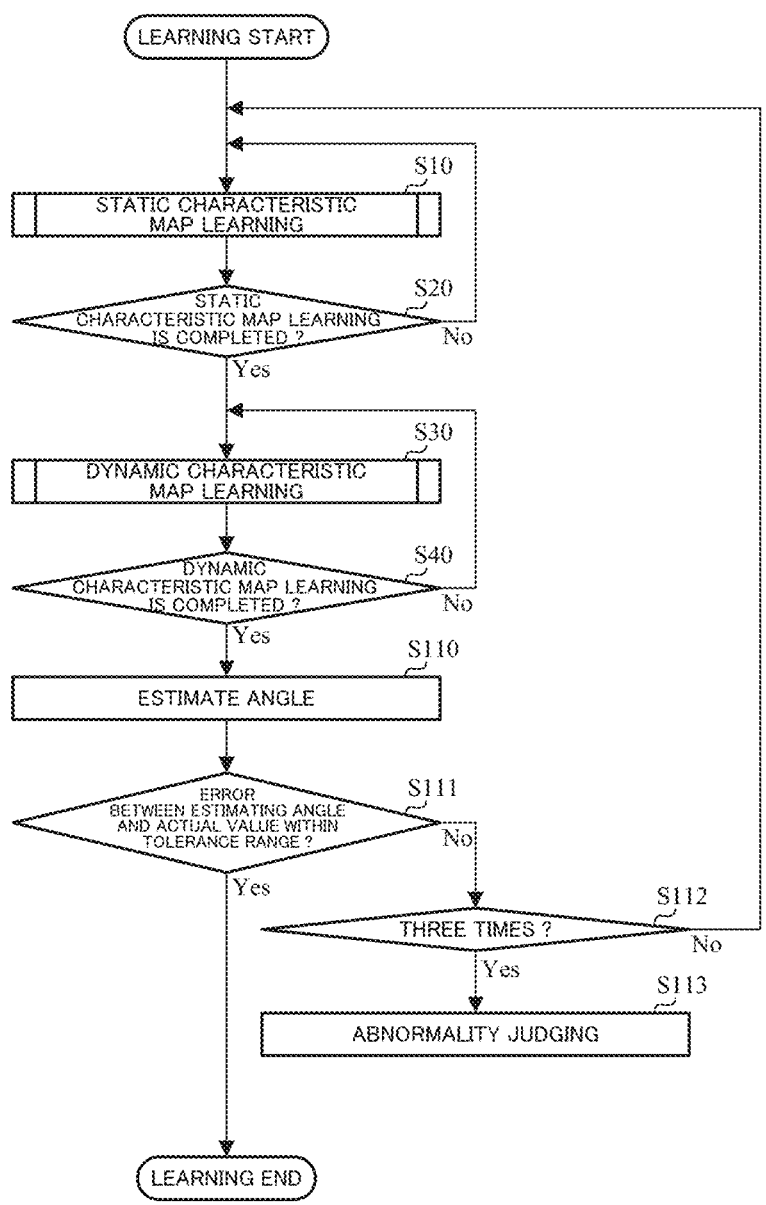
FIG. 29 is a flowchart showing an operation example of the third embodiment of the present invention.

Here, the dynamic characteristic learning is performed after the static characteristic learning, and an overall operation example (the third embodiment) which performs the angle estimating based on these learning results will be described with reference to a flowchart of FIG. 29. Even in this case, the learning may be started by judging that the compensation values are out of the approximate value ranges of the respective nominal values, as shown in FIG. 9 and FIG. 10.

At first, the learning of the nonlinear element static characteristic map 142 is performed (Step S10), and the learning is continued until the learning is completed (Step S20). When the static characteristic map can sufficiently be learned (for example, FIG. 6) to the motor torque region of the electric power steering apparatus, the leaning is completed. The learning of the nonlinear element dynamic characteristic map 151 (Step S30) is performed after completing the learning of the nonlinear element static characteristic map 142. The learning of the nonlinear element dynamic characteristic map 151 (Step S30) is continued until the learning is completed (for example, FIG. 7) (Step S40). When the dynamic characteristic map can sufficiently be learned to the motor angle velocity region of the electric power steering apparatus, the leaning is completed.

When the learning of the nonlinear element dynamic characteristic map 151 is completed, the compensation value maps are created, the angle compensation value MP is calculated by adding the compensation value CMy from the dynamic characteristic compensating section 150 to the compensation value CMs from the static characteristic compensating section 140 in the adding section 131, and the estimating angle is estimated based on the angle compensation value MP (Step S110). The steering shaft estimating angle SSe is calculated by subtracting the angle compensation value MP from the motor shaft angle Am, and the motor shaft estimating angle MSe is calculated by adding the angle compensation value MP to the steering shaft angle Ap. Then, it is diagnosed whether the errors (absolute values) between the estimating angles and the actual measuring values are within the tolerance range ε or not in accordance with the above Equation 1 or not (Step S111), and the learning is completed when the errors are within the tolerance range ε. In a case that the errors are larger than the tolerance range ε, it is judged whether the iteration number is, for example, three times or not (Step S112), and in a case that the iteration number is equal to or less than twice, the process is returned to the above Step S10 and the above process is repeated.

At the above Step S112, in a case that the iteration number is three times, it is judged that the steering system or the sensor system is failed (Step S113). A setting of the iteration number of the above Step S112 can appropriately be changeable.

By learning iteratively, the accuracy of the steering shaft estimating angle SSe and the motor shaft estimating angle MSe can be higher, and it is possible to deal with the environment variation such as a temperature and aging deterioration of the mechanism components. Although the present embodiment deals with the environment variation such as the temperature by learning iteratively, a temperature sensor is provided additionally, and the values of respective maps may be corrected depending on the detection temperature.

Figure 14:
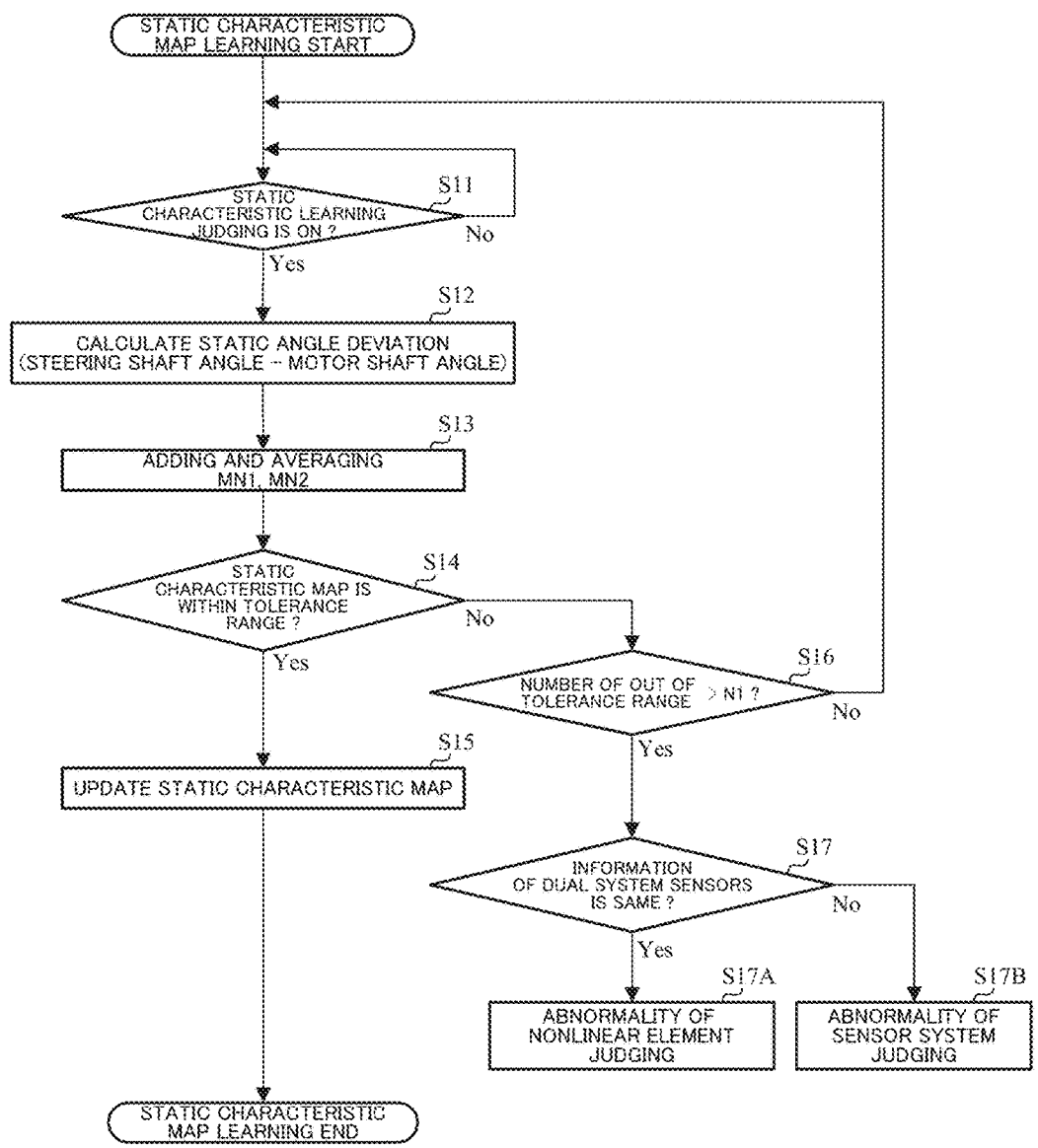
FIG. 14 is a flowchart showing a learning operation example of the static characteristic map.
Figure 17:
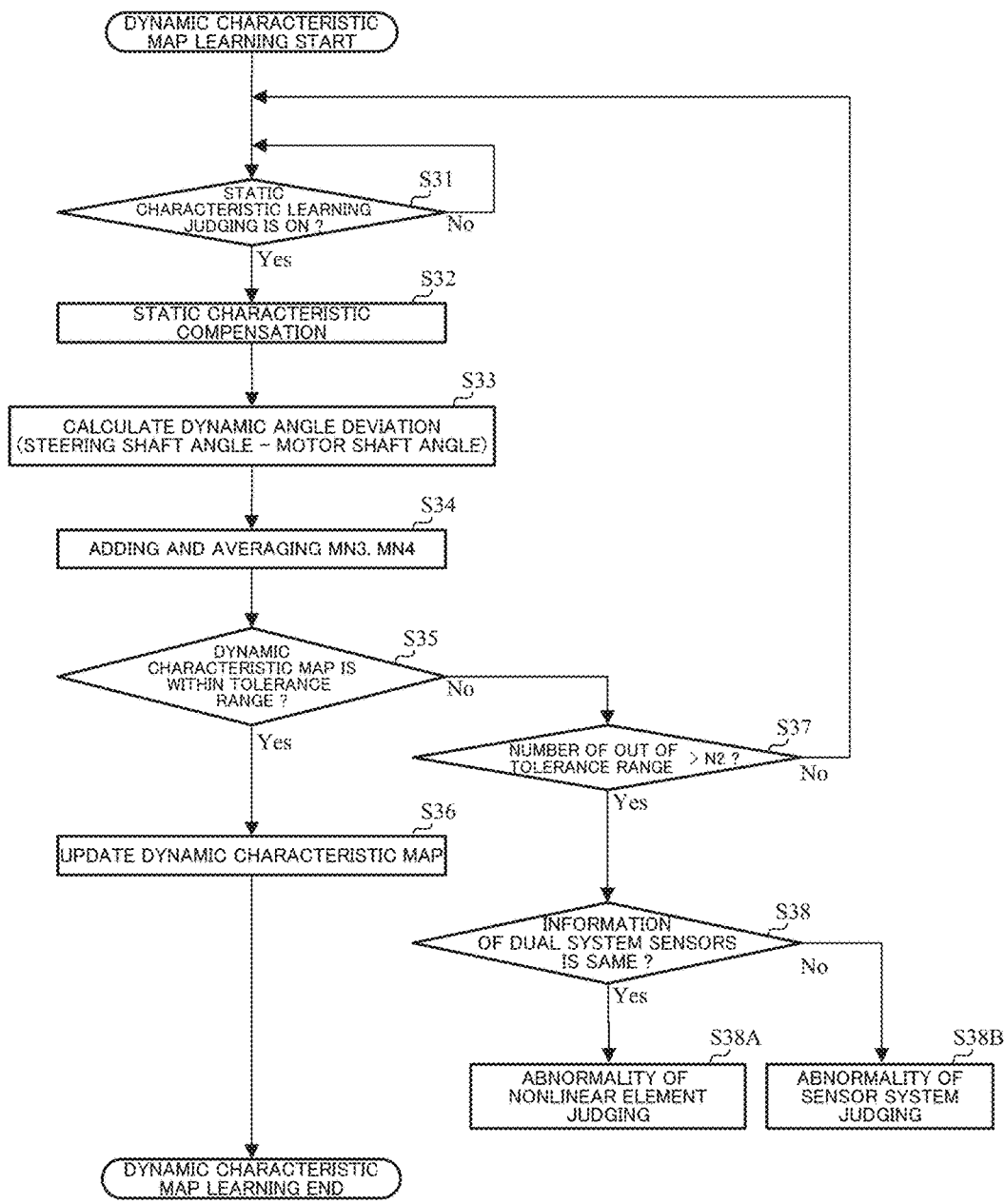
FIG. 17 is a flowchart showing a learning operation example of the dynamic characteristic map.

The learning operation of the nonlinear element static characteristic map 142 in the above Step S10 is similar to that of FIG. 14, and the learning operation of the nonlinear element dynamic characteristic map 151 in the above Step S30 is similar to that of FIG. 17.

In the above embodiments, the column-type electric power steering apparatus is described, and the present invention can be applied to a downstream-type electric power steering apparatus.

EXPLANATION OF REFERENCE NUMERALS 1, 60 handle (steering wheel)
2, 61 steering shaft (column shaft, handle shaft)
10 torque sensor
12 vehicle speed sensor
20, 66 motor
21 rotational sensor
30, 100 control unit (ECU)
62 torsion bar
63 handle-side angle sensor
64 steering shaft (pinion side) angle sensor
65 reduction mechanism
67 motor shaft angle sensor
110 motor torque calculating section
120 motor angle velocity calculating section
130 nonlinear learning logical section of nonlinear elements
140 static characteristic compensating section
142 nonlinear element static characteristic map
150 dynamic characteristic compensating section
151 nonlinear element dynamic characteristic map
152 nonlinear element delay characteristic map
180 steering shaft angle estimating section
190 motor shaft angle estimating section

The invention claimed is:

1. A vehicle steering angle detecting apparatus that connects a motor, which assist-controls a steering system of a vehicle, to a steering shaft via a reduction mechanism, and comprises a first angle sensor to detect a steering shaft angle of said steering shaft and a second angle sensor to detect a motor shaft angle of said motor, comprising:

at least one hardware processor configured to implement:
   a nonlinear learning logical section to input a motor torque calculated from a motor current of said motor, a motor angular velocity calculated from said motor shaft angle, said steering shaft angle and said motor shaft angle, and to output an angle compensation value of nonlinear elements including said reduction mechanism; and
   an estimating section to output a steering shaft estimating angle and a motor shaft estimating angle based on said angle compensation value, said steering shaft angle and said motor shaft angle,
   wherein said nonlinear learning logical section comprises:
   a static characteristic map to output a first compensation value which is a static characteristic of said nonlinear elements due to said motor torque;
   a dynamic characteristic map to output a second compensation value which is a dynamic characteristic of said nonlinear elements due to said motor angular velocity; and
   an adding section to output said angle compensation value by adding said first compensation value and said second compensation value, and
   wherein said static characteristic map and said dynamic characteristic map are updated by iteratively learning said static characteristic and said dynamic characteristic, and said steering shaft angle and said motor shaft angle mutually estimated by using said static characteristic map and said dynamic characteristic map.

2. The vehicle steering angle detecting apparatus according to claim 1, wherein a learning of said static characteristic and a learning of said dynamic characteristic are performed when initial values based on an actual measuring angle of said first angle sensor, an actual measuring angle of said second angle sensor, an actual compensation value based on said motor torque and said motor angle velocity are out of approximate value ranges of respective characteristic nominal values which are in advance stored.

3. The vehicle steering angle detecting apparatus according to claim 1, wherein a delay characteristic map is further interposed in a subsequent stage of said dynamic characteristic map.

4. The vehicle steering angle detecting apparatus according to claim 2, wherein a delay characteristic map is further interposed in a subsequent stage of said dynamic characteristic map.

5. The vehicle steering angle detecting apparatus according to claim 3, wherein a learning of a delay characteristic is performed when initial values based on an actual measuring angle of said first angle sensor, an actual measuring angle of said second angle sensor, and an actual compensation value based on said motor torque are out of approximate value ranges of delay characteristic nominal values which are in advance stored.

6. The vehicle steering angle detecting apparatus according to claim 4, wherein a learning of a delay characteristic is performed when initial values based on an actual measuring angle of said first angle sensor, an actual measuring angle of said second angle sensor, and an actual compensation value based on said motor torque are out of approximate value ranges of delay characteristic nominal values which are in advance stored.

7. The vehicle steering angle detecting apparatus according to claim 1, wherein a deviation between an estimating value of said steering shaft angle and an actual measuring value of said first angle sensor and a deviation between an estimating value of said motor shaft angle and an actual measuring value of said second angle sensor are respectively calculated, and said updating is performed in a case that said respective deviations are within respective tolerance ranges of said static characteristic map and said dynamic characteristic map.

8. The vehicle steering angle detecting apparatus according to claim 7, wherein said respective tolerance ranges have different specifications depending on a destination, and respective initial values are set depending on said destination.

9. The vehicle steering angle detecting apparatus according to claim 7, wherein said first angle sensor and said second angle sensor are a dual system, respectively.

10. The vehicle steering angle detecting apparatus according to claim 7, wherein said first angle sensor and said second angle sensor are a dual system, respectively, and said respective tolerance ranges have different specifications depending on a destination, and respective initial values are set depending on said destination.

11. The vehicle steering angle detecting apparatus according to claim 9, wherein in a case that said deviations are out of said respective tolerance ranges, said learnings of said static characteristic and said dynamic characteristic are iterated until predetermined times.

12. The vehicle steering angle detecting apparatus according to claim 10, wherein in a case that said deviations are out of said respective tolerance ranges, said learnings of said static characteristic and said dynamic characteristic are iterated until predetermined times.

13. The vehicle steering angle detecting apparatus according to claim 11, wherein in a case that a number, which said deviations are out of said respective tolerance ranges, is larger than said predetermined times, judging of detection values in respective dual systems of said first angle sensor and said second angle sensor is performed.

14. The vehicle steering angle detecting apparatus according to claim 12, wherein in a case that a number, which said deviations are out of said respective tolerance ranges, is larger than said predetermined times, judging whether detection values in respective dual systems of said first angle sensor and said second angle sensor are same or not, is performed.

15. The vehicle steering angle detecting apparatus according to claim 13, wherein in said judging, in a case that detection values in respective dual systems of said first angle sensor and said second angle sensor are a same value, an abnormality of said nonlinear elements is judged, and in a case that detection values in respective dual systems of said first angle sensor and said second angle sensor are not a same value, an abnormality of said sensor system is judged.

16. The vehicle steering angle detecting apparatus according to claim 14, wherein in said judging, in a case that detection values in respective dual systems of said first angle sensor and said second angle sensor are a same value, an abnormality of said nonlinear elements is judged, and in a case that detection values in respective dual systems of said first angle sensor and said second angle sensor are not a same value, an abnormality of said sensor system is judged.

17. An electric power steering apparatus having said vehicle steering angle detecting apparatus according to claim 1.

18. An electric power steering apparatus having said vehicle steering angle detecting apparatus according to claim 1,
wherein, when an abnormality of an estimating angle in one sensor system is judged, said assist-control is continued by using an estimating angle in the other sensor system.

19. An electric power steering apparatus having said vehicle steering angle detecting apparatus according to claim 14,
wherein, when an abnormality of an estimating angle in one sensor system is judged, said assist-control is continued by using an estimating angle in the other sensor system.

* * * * *